April 23, 1957 — E. NYYSSONEN — 2,790,098
POLYPHASE SYNCHRONOUS MACHINE
Filed Dec. 3, 1953 — 11 Sheets-Sheet 1

INVENTOR.
Emard Nyyssonen

INVENTOR.

INVENTOR.
Einard Nyyssonen

INVENTOR.
Einard Nyyssonen

INVENTOR.
Einard Nyyssonen

April 23, 1957  E. NYYSSONEN  2,790,098
POLYPHASE SYNCHRONOUS MACHINE
Filed Dec. 3, 1953  11 Sheets-Sheet 6
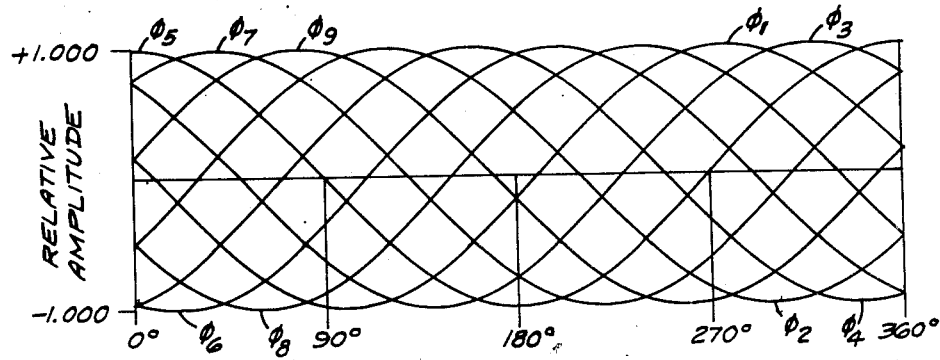
FIG. 10
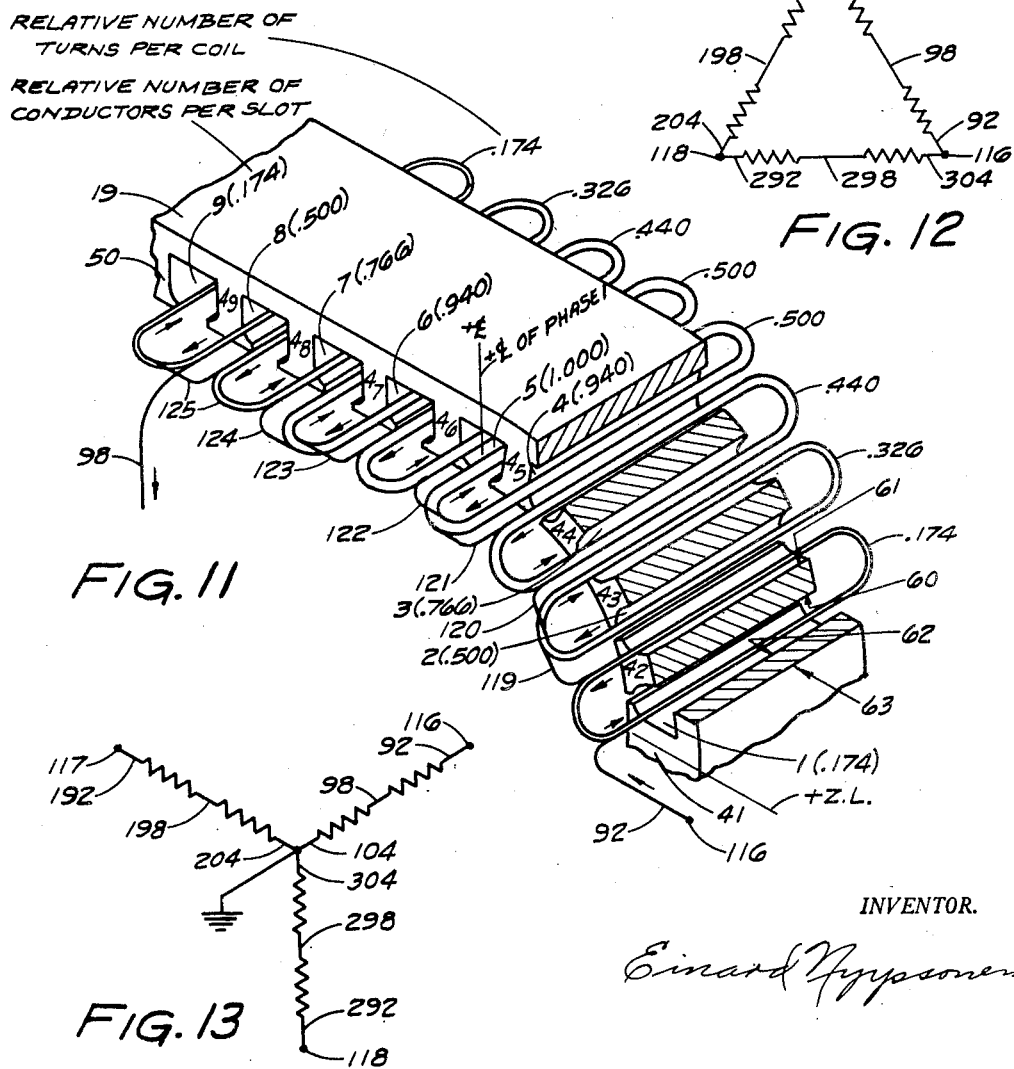
FIG. 11
FIG. 12
FIG. 13
INVENTOR.
Einard Nyyssonen

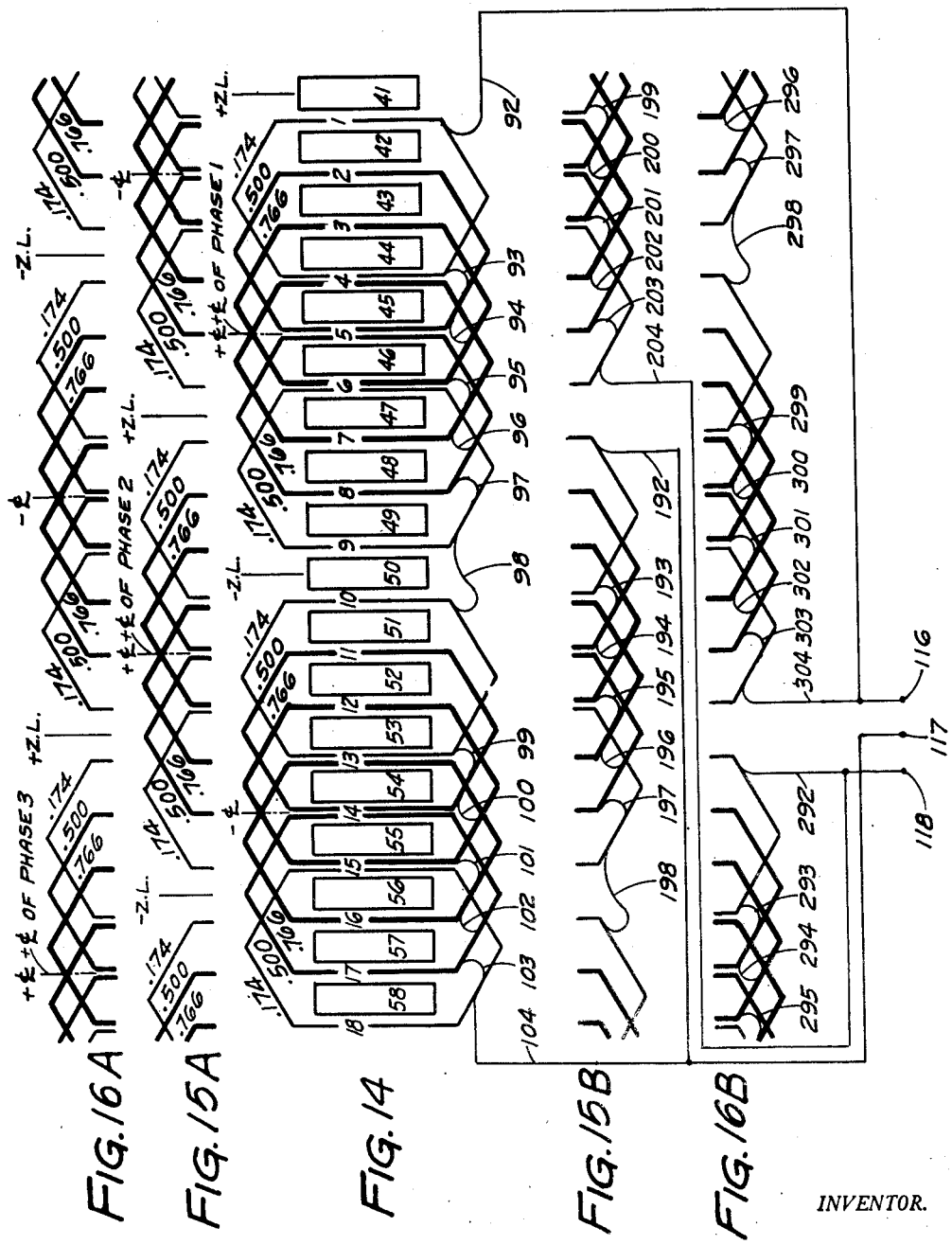

April 23, 1957  E. NYYSSONEN  2,790,098
POLYPHASE SYNCHRONOUS MACHINE
Filed Dec. 3, 1953  11 Sheets-Sheet 9

INVENTOR.
Einard Nyyssonen

April 23, 1957  E. NYYSSONEN  2,790,098

POLYPHASE SYNCHRONOUS MACHINE

Filed Dec. 3, 1953  11 Sheets-Sheet 10

INVENTOR.
Einard Nyyssonen

INVENTOR.
Einard Nyyssonen

United States Patent Office 2,790,098
Patented Apr. 23, 1957

2,790,098

POLYPHASE SYNCHRONOUS MACHINE

Einard Nyyssonen, Watertown, Mass.

Application December 3, 1953, Serial No. 395,972

37 Claims. (Cl. 310—202)

The present invention relates to polyphase synchronous machines.

An object of the invention is to provide a new and improved polyphase synchronous machine.

A further object of the invention is to provide a synchronous machine of the above-described character in which detrimental harmonics of the induced voltages shall be effectively cancelled under substantially all conditions, particularly of balanced load.

Other and further objects will be explained hereinafter and will be more particularly pointed out in the appended claims.

Figure 1:
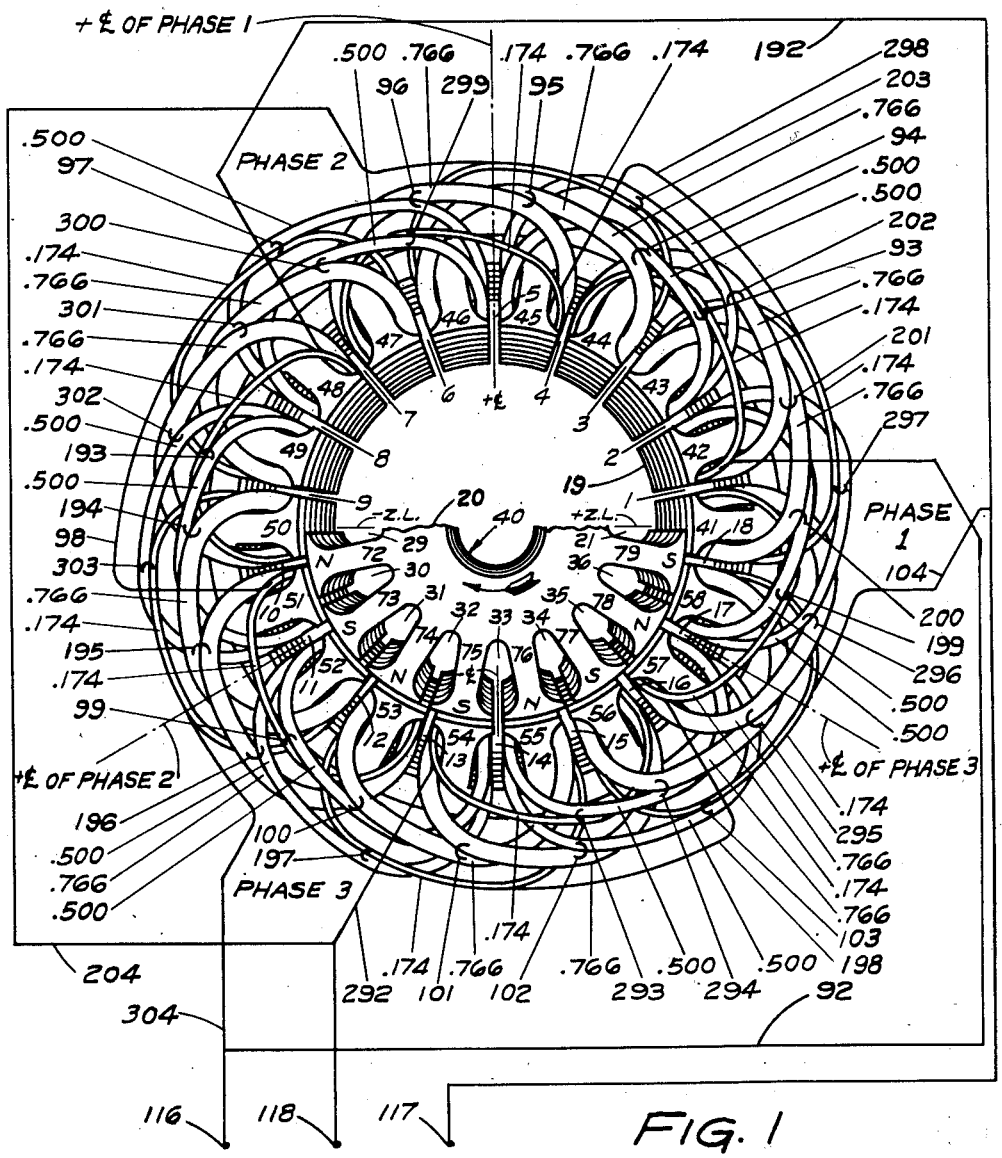
Figure 2:
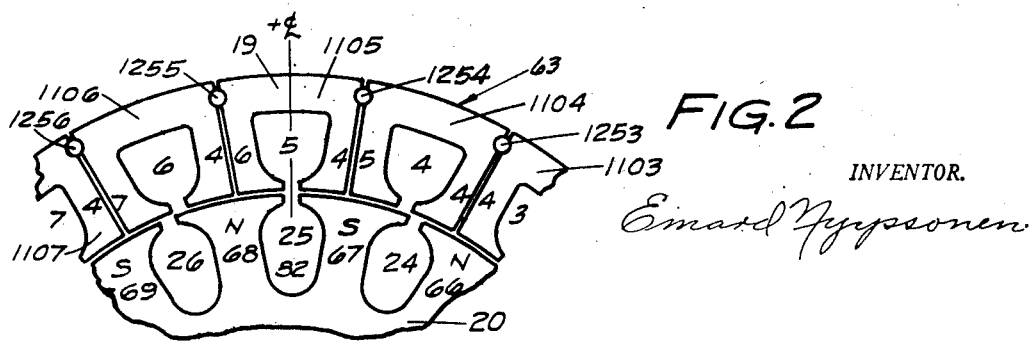
Figure 3:
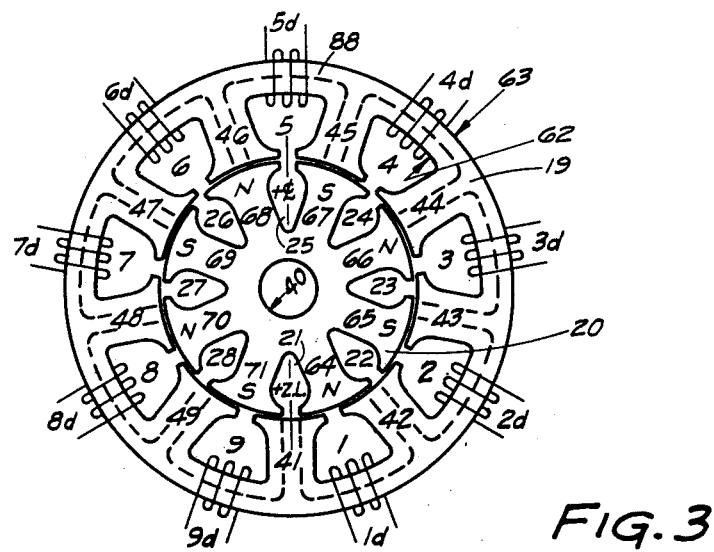
Figure 4:
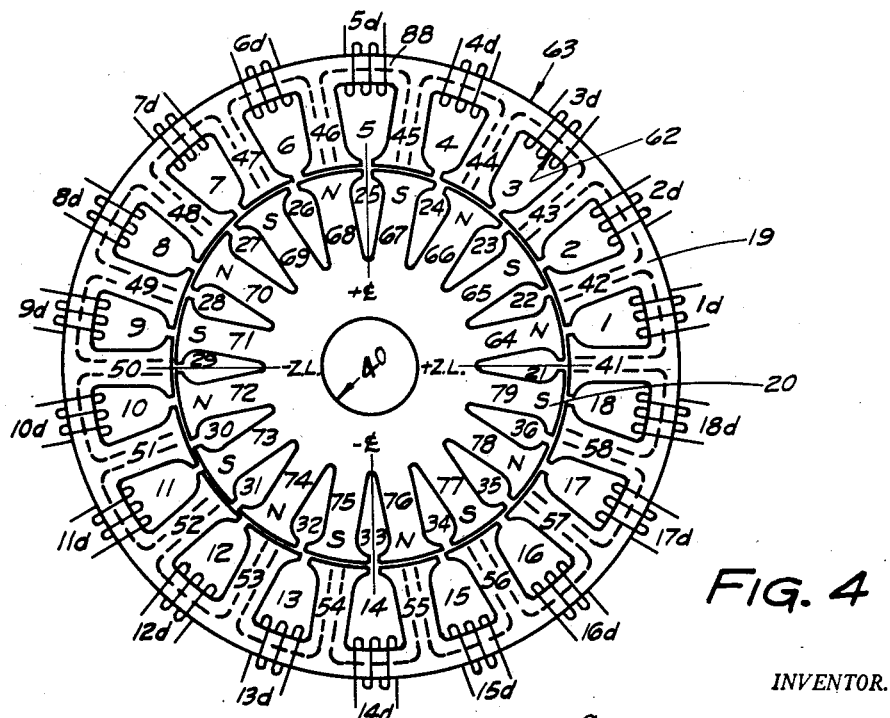
Figure 5:
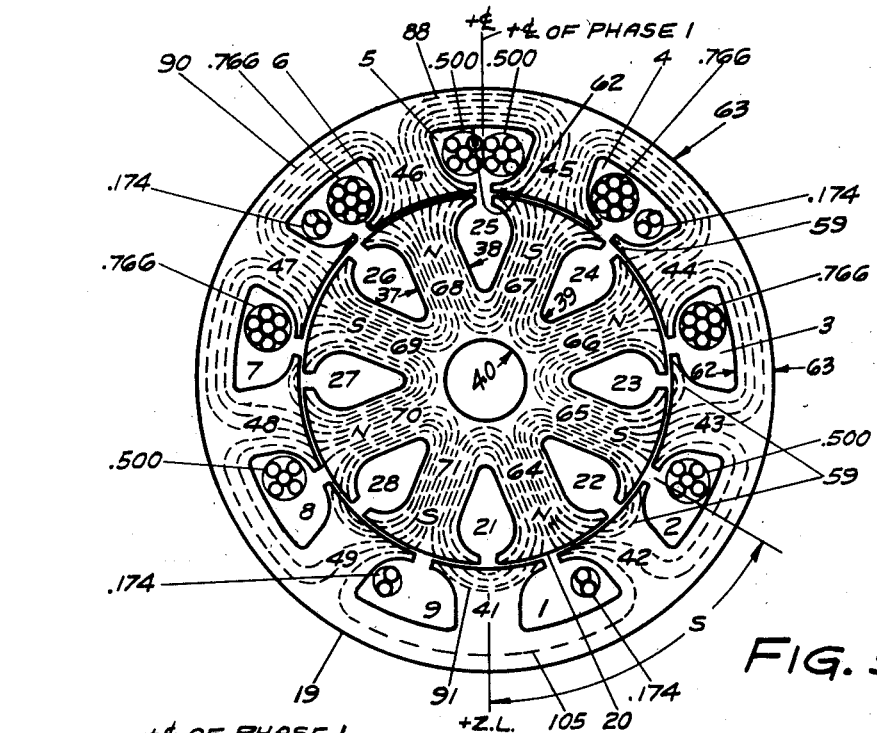
Figure 6:
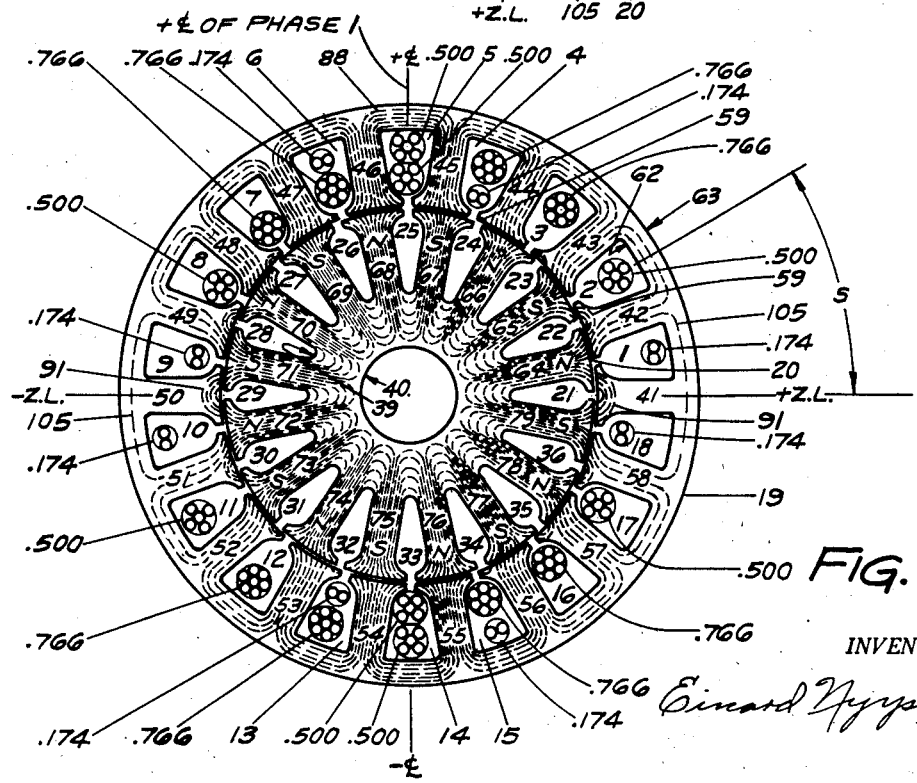
Figure 7:
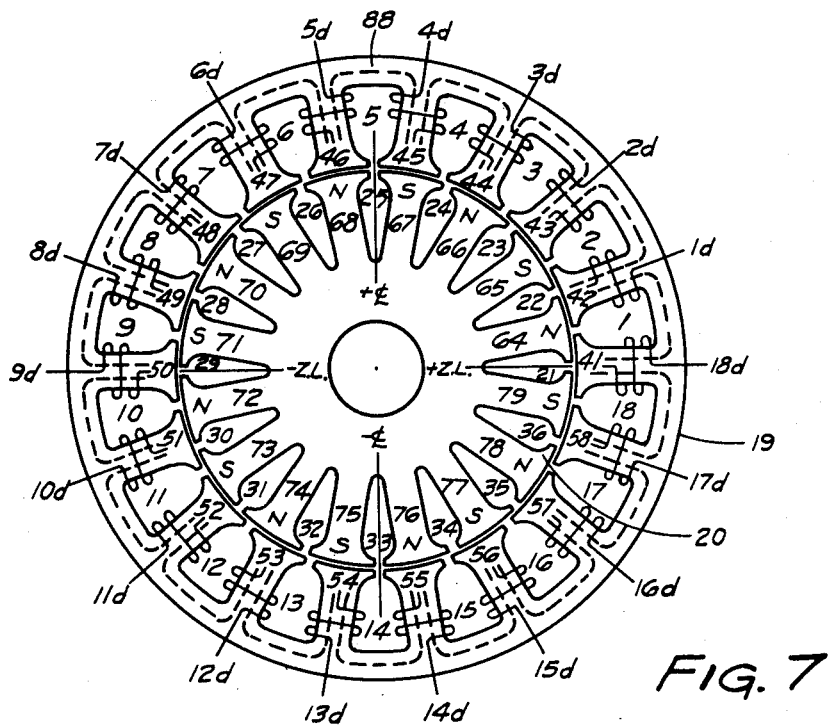
Figure 8:
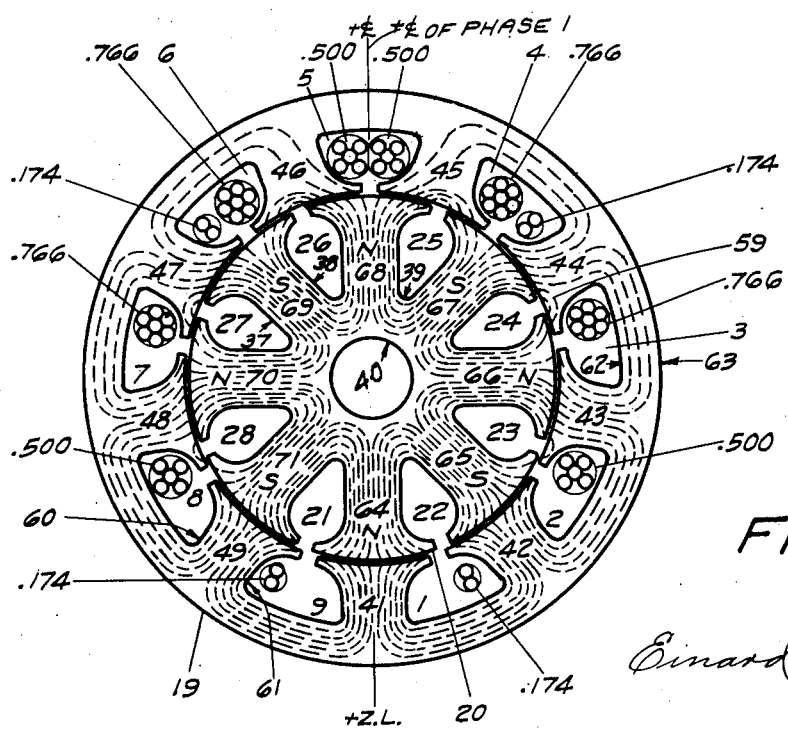
Figure 9:
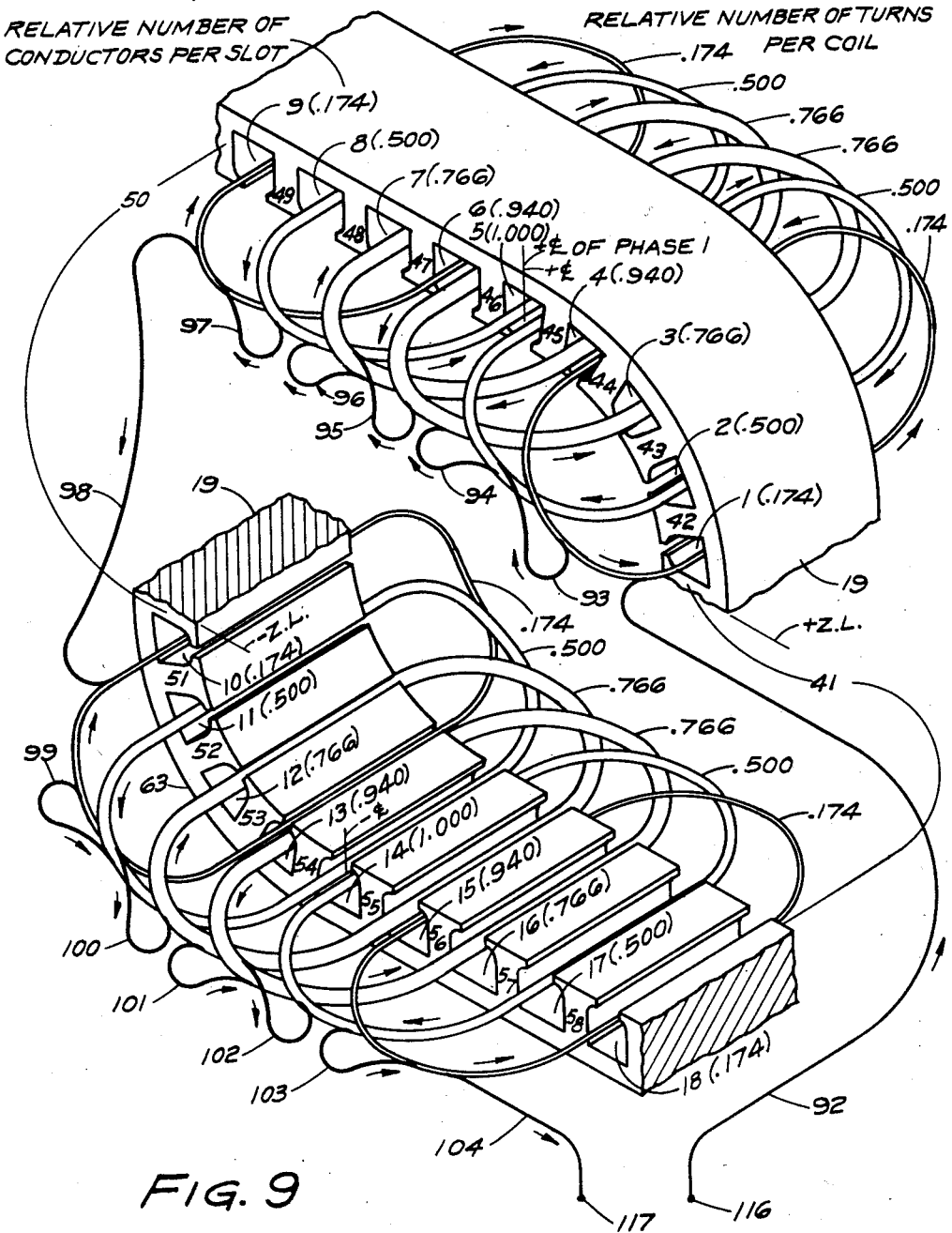
Figure 17:
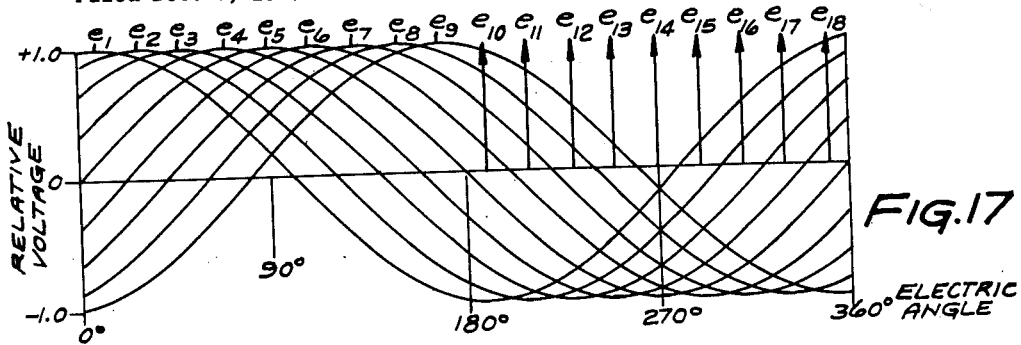
Figure 19:
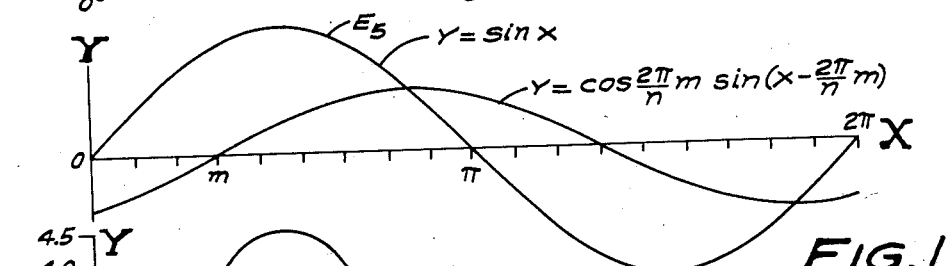
Figure 18:
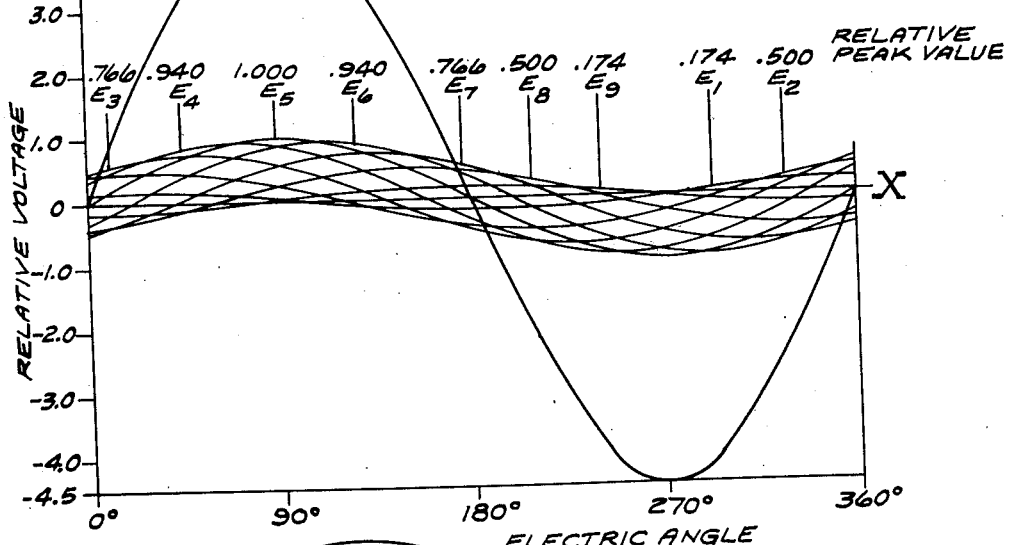
Figure 20:
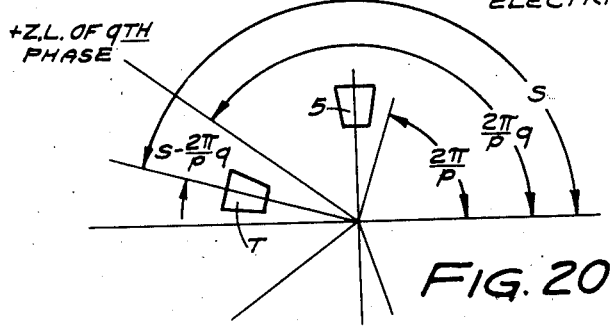
Figure 21:
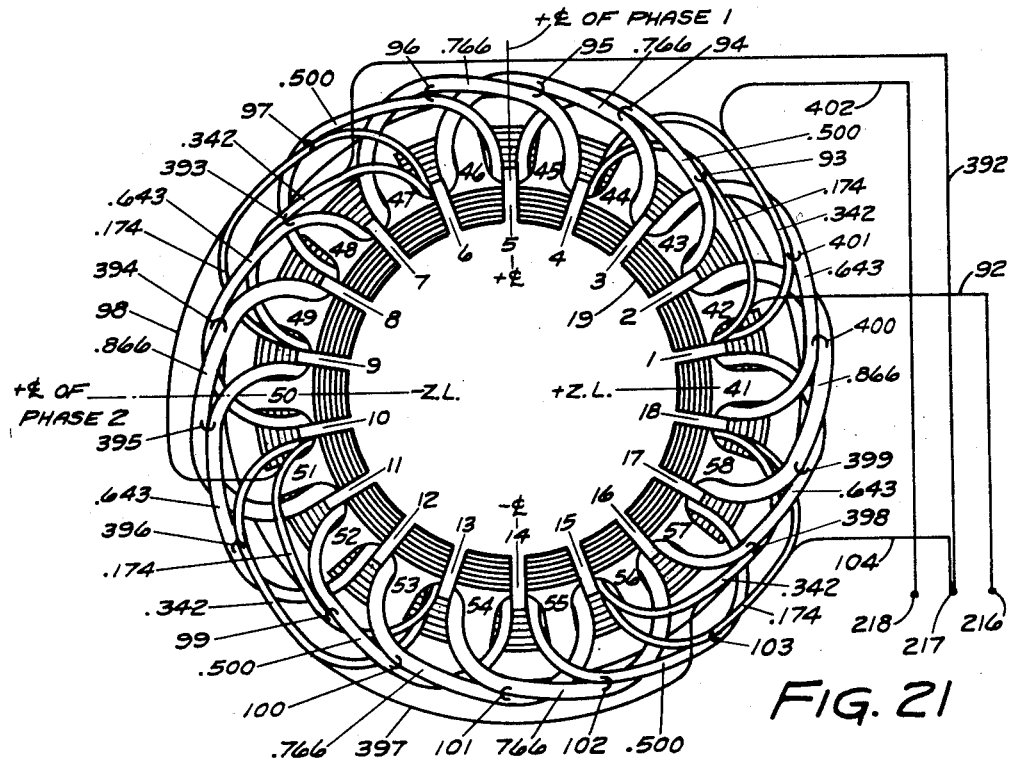
Figure 22:
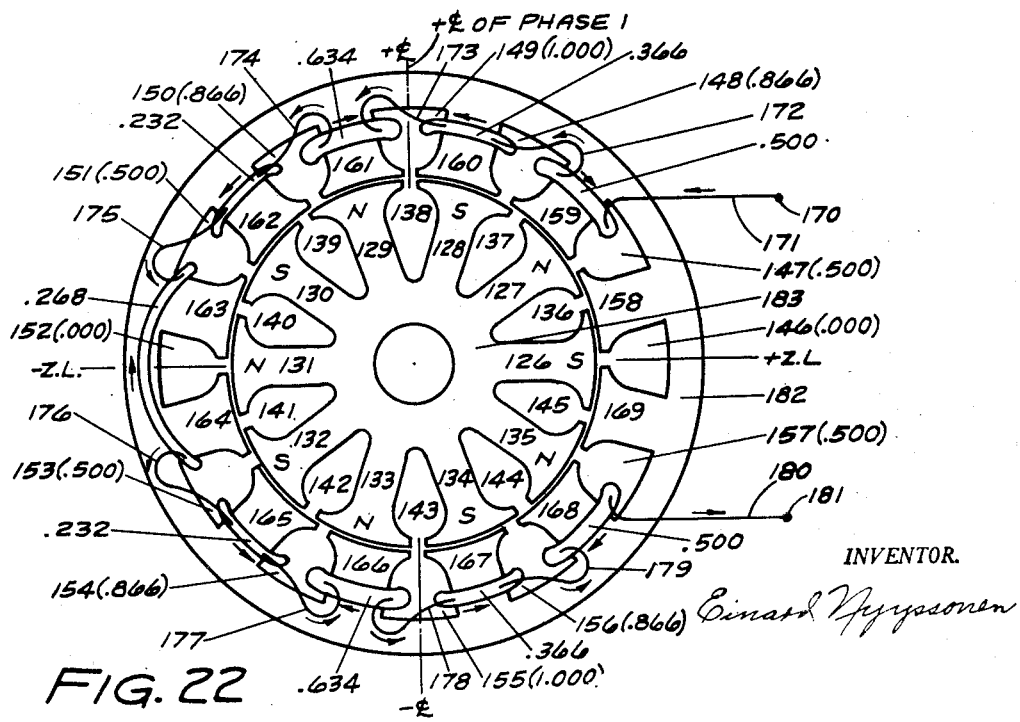
Figure 23:
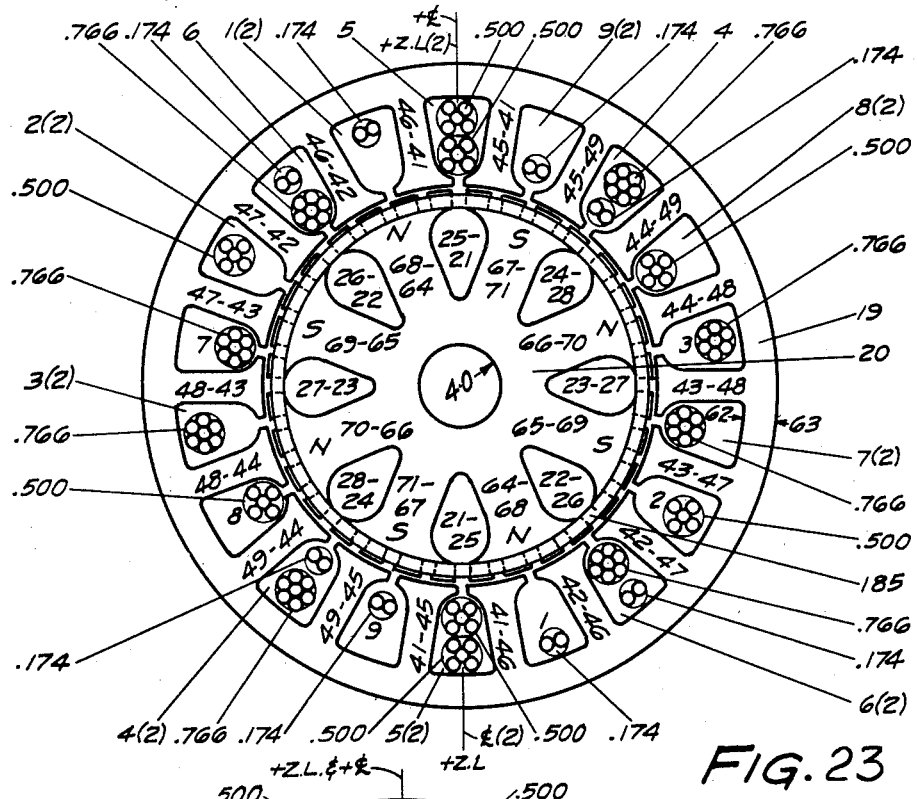
Figure 24:
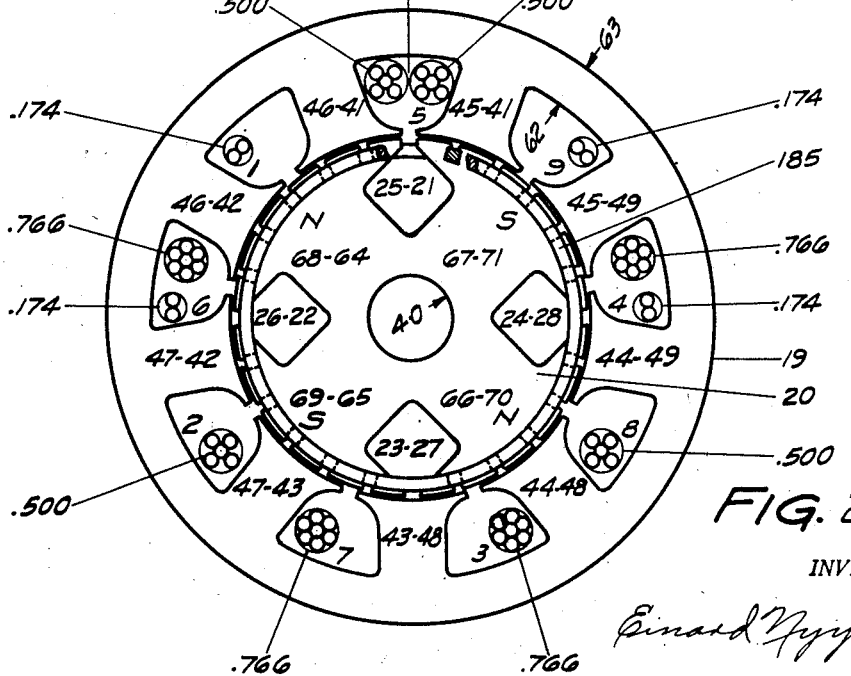
Figure 25:
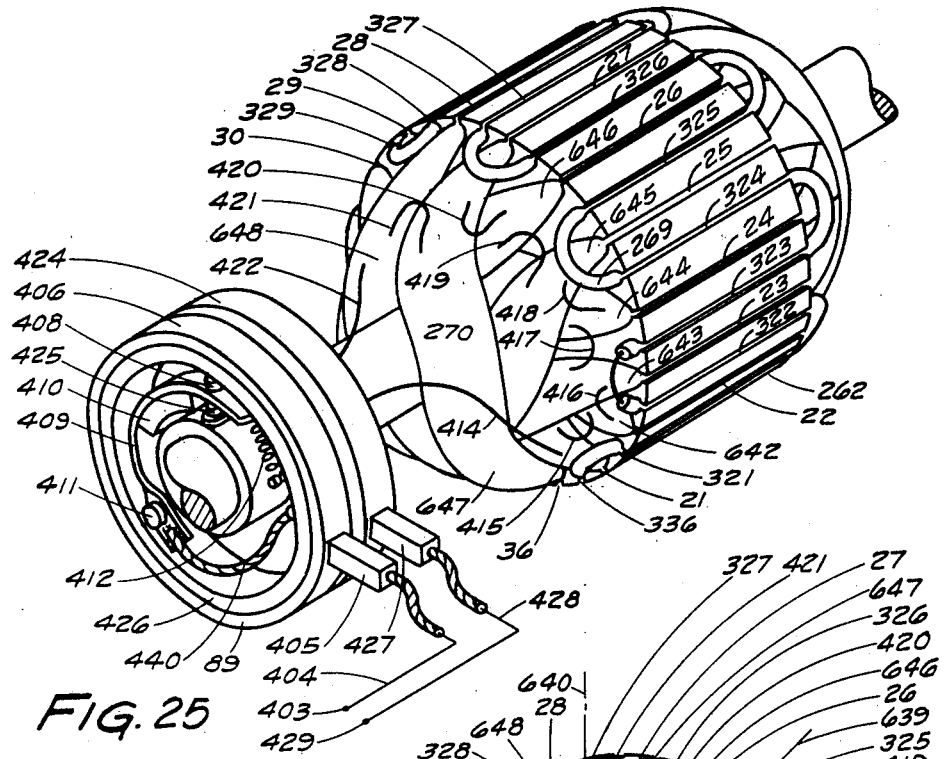
Figure 26:
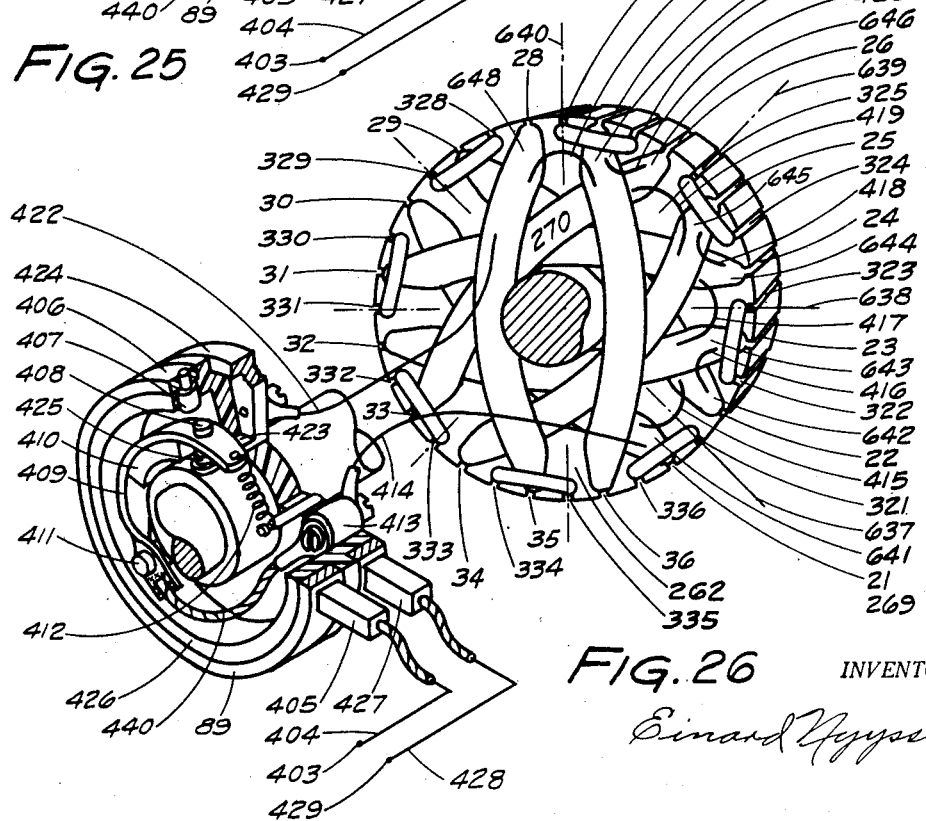

The invention will now be more fully explained in connection with the accompanying drawings, in which Fig. 1 is a schematic diagrammatic view of a three-phase synchronous alternator or motor embodying the present invention, the armature being shown provided with a distributed polyphase winding comprising three overlapped distributed conductor-group phase windings, a part of the field-magnet element being shown cut away, and with the conventional field-magnet windings omitted, for clearness; Fig. 2 is a fragmentary similar diagrammatic view illustrating a modified armature-core structure; Fig. 3 is a view similar to Fig. 1 of a modification, illustrating a nine-phase synchronous alternator or motor, the armature of which is shown provided with a polyphase winding comprising individual concentrated phase windings; Fig. 4 is a similar view of an eighteen-phase synchronous alternator or motor; Fig. 5 is a view similar to Fig. 3, but with the armature provided with the conductor groups of only one distributed phase winding, which may be considered as the phase 1 distributed phase winding of a polyphase winding similar to the polyphase winding illustrated in Fig. 1 and illustrating also, by dot and dash lines, the paths of the magnetic linkages; Fig. 6 is similarly a schematic view similar to Fig. 4; Fig. 7 is a view similar to Fig. 4, but illustrating a polyphase winding comprising modified individual concentrated phase windings; Fig. 8 is a view similar to Fig. 5, but illustrating the field-magnet element in a different position with respect to the armature; Fig. 9 is a fragmentary, somewhat distorted, perspective illustrating the conductor groups of Fig. 6 connected into a distributed phase winding; Fig. 10 is a diagram, in Cartesian coordinates, illustrating, in their true polarity, the alternating magnetic fluxes, assumed to be sinusoidal, induced in the magnetic circuits encircling the armature slots shown in Figs. 1 to 9; Fig. 11 is a fragmentary, somewhat distorted, perspective similar to Fig. 9, of a modification; Figs. 12 and 13 are diagrams illustrating delta and Y connections, respectively, for the three-phase synchronous machine illustrated in Fig. 1; Fig. 14 represents diagrammatically a development, in a plane, of the conductor groups of the distributed phase winding illustrated in Figs. 6 and 9, arranged in a setting to correspond to phase 1 of the three-phase synchronous generator or motor illustrated in Fig. 1, and showing also the geometric and phase relations with respect to phase 2 and phase 3; Figs. 15A and 15B represent a similar development for phase 2 of the same three-phase synchronous generator or motor, so arranged as to show the relations with respect to phases 1 and 3; Figs. 16A and 16B represent a diagrammatic development similar to Figs. 15A and 15B for phase 3, so arranged with respect to Figs. 14, 15A and 15B, as to show the phase relations between phases 1, 2 and 3, and with suitable conductors for connecting phase 3 to phases 1 and 2; Fig. 17 is a diagram similar to Fig. 10 illustrating, disregarding the alternately opposite polarity, the alternating voltages, similarly assumed to be sinusoidal, induced in unit conductor groups, each assumed to have a unit number of conductors, one disposed in each of the positive collection of stator slots illustrated in Figs. 1 to 9 and 11; Fig. 18 is a diagram, in Cartesian coordinates, explanatory of the component voltages induced in the conductor groups of the distributed phase winding corresponding to phase 1 shown in Figs. 5 and 6, when all the component voltages are assumed sinusoidal; Fig. 19 is a diagram illustrating by means of curves, for explanatory purposes, two sinusoidal voltage components; Fig. 20 is a diagram for facilitating the calculation of the magnetomotive forces; Fig. 21 is a diagrammatic view similar to Fig. 1 of the armature of the two-phase synchronous machine embodying the present invention; Fig. 22 is a diagram of a modified synchronous machine embodying the present invention, but illustrating only one distributed armature phase winding; Fig. 23 is a diagrammatic view similar to Fig. 5 of a synchronous machine provided with an armature having two identical single-collection assemblies of slots provided with identical distributed phase windings, shown in section, the field-magnet shown being provided with a squirrel-cage type winding for induction starting and damping when the machine is operated as a synchronous motor; Fig. 24 is a diagrammatic view similar to Fig. 5, but with the single-collection assembly of armature slots distributed over twice the circumference, and with the field magnet being provided with a squirrel-cage winding similar to the squirrel-cage winding illustrated in Fig. 23, for purposes of induction starting and damping; Fig. 25 is a perspective illustrating the field-magnet element only of a synchronous motor embodying the present invention, the field-magnet element being shown provided with a field-magnet winding and an induction starting-and-damping winding electrically displaced with respect thereto, the field-magnet winding being shown provided with a centrifugally operated switch for short-circuiting the field-magnet winding for induction starting and for connecting the field-magnet winding to a source of direct current for operation as a synchronous motor; and Fig. 26 is a distorted perspective of the field-magnet element illustrated in Fig. 25, with parts broken away and other parts displaced with respect to one another, in order to illustrate more schematically the disposition of the field-magnet windings.

The synchronous generator or motor of the present invention, like other synchronous generators or motors, embodies armature and field-magnet stator and rotor elements, each comprising a magnetizable core. As diagrammatically illustrated in Fig. 1, for example, and for explanatory purposes, the armature element 19 may be taken as the stator and the field-magnet element 20 as the rotor. This arrangement may, of course, be reversed, with the armature element 19 as the rotor and the field-magnet element 20 as the stator.

For brevity, the description herein will be confined largely to the synchronous generator. The principles explained will be understood to be applicable also to the synchronous motor, however, for a synchronous motor is a generator supplied with electric power and brought to operational speed by some auxiliary means.

As in present-day synchronous machines, the stator and the rotor are in all cases both shown annular in shape, with the rotor mounted for rotation, within the annulus of the stator, about a common center of the annuli of the stator and rotor. The outer circular periphery of the stator annulus is indicated by the arrow 63, and the inner circular periphery of the rotor is indicated by the arrow 40. The rotor shaft may be fixed within the inner circular periphery 40 of the rotor in any desired way.

In Figs. 1, 2, 4, 6, 7, 9, 11 and 21, the magnetizable core of the annular stator 19 is shown provided along its internal circular periphery with a plurality of equally spaced consecutively disposed teeth 41 to 58, of the same size and shape, alternately disposed with the stator slots 1 to 18, each shown eighteen in number. In Figs. 3, 5 and 8, the stator 19 is shown provided with only nine stator teeth 41 to 49, alternately disposed with only nine stator slots 1 to 9. The nine-slot-and-tooth stator 19 of Figs. 3, 5 and 8, therefore, corresponds to one-half of the eighteen-slot-and-tooth stator 19 of Figs. 1, 2, 4, 6, 7, 9, 11, 14 to 16 and 21. The peripheral portion 88 of the stator 19 is included between the outer circular periphery 63 and the outer boundaries 62 of the stator slots.

In practice, of course, the stator may be provided with any desired number of stator slots and stator teeth. In Fig. 22, for example, the stator 182 is shown provided with twelve stator slots 146 to 157 and twelve stator teeth 158 to 169.

The eighteen stator slots 1 to 18 of Figs. 1, 2, 4, 6, 7, 9, 11, 14 to 16 and 21 will be referred to as an assembly of two similar collections, each of nine stator slots 1 to 9 and 10 to 18, respectively, and the eighteen stator teeth 41 to 58 as an assembly of two similar collections, each of nine stator teeth 41 to 49 and 50 to 58, respectively. The nine stator slots 1 to 9 will be referred to as a positive collection of stator slots, and the nine stator slots 10 to 18 as a corresponding negative collection of stator slots. The stator teeth 41 to 49 will similarly be referred to as the positive collection of stator teeth of the two-collection assembly of stator teeth 41 to 58, to distinguish it from the negative collection of stator teeth 50 to 58 of this assembly of stator teeth 41 to 58.

The assembly of stator slots 1 to 9 and the assembly of stator teeth 41 to 49 of the stator 19 of Figs. 3, 5 and 8, of course, is each constituted of only a single collection of nine stator slots and nine stator teeth, respectively.

As will appear hereinafter, the synchronous machine of the present invention is not restricted to use with a stator having an assembly of only one or two collections of stator slots and stator teeth. The assembly may comprise also three, four or any other convenient number of collections of stator slots and stator teeth.

The rotor 20 may be of conventional or any other suitable type. In Figs. 1 to 8 and 22, it is illustrated as of the type conventionally provided with a multi-poled field-magnet winding, not shown, wound around the pole pieces, through the intermediately disposed rotor slots. In Figs. 25 and 26, it is shown provided with a multi-poled field-magnet winding 270, disposed in the same rotor slots. These field-magnet windings may be conventionally excited from a suitable source of direct current to produce a magnetic field, stationary with respect to the rotor 20, the adjacently disposed poles of opposite polarity of which are indicated at N and S, to represent north and south, respectively.

The rotor 20 is illustrated in Figs. 1, 2, 4, 6, and 7 as provided along its external circular periphery with an assembly of sixteen equally spaced rotor poles 64 to 79, of the same size and shape, two less than the eighteen stator teeth 41 to 58, divided into two similar collections: one, the positive collection of rotor poles 64 to 71; and the other, the negative collection of rotor poles 72 to 79. The rotor 20 is shown provided also with an assembly of sixteen equally spaced rotor slots 21 to 36 of the same size and shape, disposed alternately with the rotor poles of the assembly of rotor poles 64 to 79, also divided into two similar collections: one, the positive collection of rotor slots 21 to 28; and the other, the negative collection of rotor slots 29 to 36. According to the embodiment of the invention illustrated in Figs. 3, 5 and 8, the number of rotor poles in each single-collection assembly of rotor poles 64 to 71 and the number of rotor slots in each single-collection assembly of rotor slots 21 to 28 is similarly shown as eight, which is one less than nine, the number of stator teeth in each collection of stator teeth and the number of stator slots in each collection of stator slots.

The manner of cooperation of the rotor 20 with the stator 19 will be more fully explained presently. It will appear that the operation depends upon the rotor having one more or one less pole or slot in each collection of rotor poles or slots than the stator is provided with teeth or slots in each collection of stator teeth or slots. If the number of stator teeth in each collection of stator teeth and the number of stator slots in each collection of stator slots be retained as nine, as illustrated in Figs. 1 to 8, 14 to 16 and 21, a rotor would serve equally well the number of rotor poles in each collection of rotor poles and the number of rotor slots in each collection of rotor slots of which is ten rather than eight. If, on the other hand, the number of rotor poles in each collection of rotor poles and the number of rotor slots in each collection of rotor slots be retained as eight, as is also illustrated in Figs. 1 to 8 and 21, a stator would serve equally well the number of stator teeth in each collection of stator teeth and the number of stator slots in each collection of stator slots of which is seven, rather than nine.

It has already been explained that the assembly of stator teeth and the assembly of stator slots may have less or more than two collections. The corresponding assembly of rotor poles and the corresponding assembly of rotor slots, of course, should have the same number of collections of rotor poles and rotor slots.

As magnetic poles occur always physically in pairs, one pole positive and the other negative, the number of rotor poles of each assembly of rotor poles and, therefore, the number of rotor slots of each assembly of rotor slots must always be even. In single-collection assemblies, therefore, the number of stator teeth and stator slots, as it is one more or one less than the number of rotor poles and rotor slots, must be odd, as illustrated in the said Figs. 3, 5 and 8. The same is true of assemblies having any odd number of collections.

In synchronous machines according to the invention embodying an assembly having an even number of collections, however, the number of rotor poles or rotor teeth in each collection of rotor poles or rotor teeth may be either odd or even, since the sum of the two odd or even numbers in each two collections is even. In Fig. 22, for example, the number five of rotor poles in the respective collections 126 to 130 and 131 to 135 of the two-collection assembly of rotor poles 126 to 135, and in the respective collections 136 to 140 and 141 to 145 of the two-collection assembly of ten rotor slots 136 to 145, is one less than the number six in each of the two collections of the assembly of twelve stator teeth 158 to 169, or the assembly of twelve stator slots 146 to 157, of the stator 182. The sum total of ten rotor poles of the two collections provides four pairs of positive and negative poles, two pairs in each collection, and also a further positive pole in one of the collections and a further negative pole in the other collection.

In two-collection assemblies in which the number of stator slots or teeth is divisible by two, but not by four, therefore, as illustrated by the eighteen stator slots or teeth of Figs. 1, 2, 4, 6, 7, 9, 11, 14 to 16 and 21, the number of stator slots or stator teeth in each collection of stator slots or teeth is odd, and the number or rotor poles of slots in each collection of rotor poles or slots is even.

Each of the stator slots 1 to 18 is encircled by a magnetic circuit energized with alternating magnetic flux through the action of the rotor poles. A system of magnetic circuits is thus produced that is stationary with respect to the stator element 19. These magnetic circuits are represented diagrammatically in Figs. 3, 4 and 7 by means of single dashed lines. The magnetic circuit encircling the stator slot 5, for example, comprises the two adjacently disposed stator teeth 45 and 46, the part 88 of the peripheral portion of the stator 19 and also a peripheral portion of the rotor 20. A magnetic system of eighteen magnetic circuits of alternately opposite polarity is thus provided, respectively encircling the stator slots 1 to 18.

The nested dashed lines of Figs. 5 and 6 indicate the distribution of the magnetic flux in these magnetic circuits at the instant of time, during the rotation of the rotor 20, at which the rotor slot 25 is alined radially with the stator slot 5. Dashed lines closer together indicate a greater density of magnetic flux than dashed lines spaced farther apart.

At this instant, the magnetic flux induced by the poles 67 and 68 in the magnetic circuit encircling the stator slot 5 travels radially outward along the positive or north pole 68, between the arrows 37 and 38, then outward along the stator tooth 46, next peripherally along the peripheral portion 88 of the stator core 19, between its outer circumference 63 and the outer boundary 62 of the stator slot 5, and finally inward, along the stator tooth 45, to the negative or south pole 67. The magnetic flux will complete the circuit radially inward along the negative or south pole 67, and around the rotor slot 25, to the positive or north pole 68. Because of the radial alinement, at this time, of the stator slot 5 and the rotor slot 25, this magnetic flux in the magnetic circuit encircling the stator slot 5 is obviously at a maximum.

The value of the magnetic flux of the magnetic circuit encircling the stator slot 5, though at its maximum when the stator 19 and the rotor 20 occupy the relative positions shown in Figs. 5 and 6, decreases as the rotor turns either clockwise or counterclockwise, until it reaches a minimum or zero value. This occurs when the rotor has rotated until the rotor pole 68 or 67, as the case may be, becomes exactly alined radially with the stator slot 5. Fig. 8, for example, illustrates, by dashed lines, the magnetic-flux conditions when the rotor pole 68 is alined radially with the stator slot 5. The value of the magnetic flux then increases, as the rotor 20 continues to rotate, though in the direction of opposite polarity, until the opposite or negative peak amplitude is reached, after which it again approaches the zero value. The negative peak amplitude of the magnetic flux of the magnetic circuit encircling the stator slot 5 occurs when the rotor poles 63 and 69, or the rotor poles 66 and 67, respectively, assume the positions illustrated for the rotor poles 67 and 68 in Figs. 5 and 6, and the further zero value occurs when the rotor pole 69 or the rotor pole 66 becomes exactly alined with the stator slot 5. The original condition will again become fully restored when the rotor slot 27 or the rotor slot 23, respectively, assumes the position of radial alinement with the stator slot 5. The magnetic flux of the magnetic circuit encircling the stator slot 5 thus varies through a complete cycle equivalent to 2π or 360 magnetic degrees during π/2 or 90 degrees of rotation of the rotor 20 of Fig. 5, and during π/4 or 45 degrees of rotation of the rotor 20 of Fig. 6. The angle of rotation, in each case, is the angular distance between two like poles.

The magnetic flux of the magnetic circuit encircling each of the other stator slots 1 to 4 and 6 to 18 varies similarly through a complete cycle of 2π or 360 magnetic degrees when the rotor 20 is rotated the angular distance from any magnetic pole to the next magnetic pole of the same polarity. Their cycles, however, are progressively phase-displaced.

Assuming a clockwise rotation of the rotor 20, the alternating magnetic fluxes of the magnetic circuits encircling the stator slots 1 to 18 attain their peak values in sequence at intervals each equal to 20 magnetic degrees of the above-described cycle. Considering the alternately opposite polarity of the magnetic circuits, the phase displacement of the alternating magnetic fluxes of the magnetic circuits encircling adjacent stator slots of either the single-collection assembly of Fig. 5 or the two-collection assembly of Fig. 6 is therefore equal to 20 plus 180 or 200 magnetic degrees. Disregarding the alternately opposite polarity, the alternating magnetic fluxes of the single-collection assembly of Figs. 3, 5 and 8 are equally phase-displaced over a theoretical total range of π or 180 magnetic degrees. Similarly, disregarding the alternately opposite polarity, the alternating magnetic fluxes of the two-collection assembly of Figs. 1, 2, 4, 6, 7, 9, 11, 14 to 16 and 21 are equally phase-displaced over a theoretical total range of 2π or 360 magnetic degrees.

The explanation for the alternating magnetic fluxes of the magnetic circuits has depended upon there being one more stator slot and stator tooth in the respective collections of stator slots and stator teeth than the number of rotor slots and rotor poles in the respective collections of rotor slots and rotor poles. The explanation would have been very similar, however, if the number of stator slots and stator teeth of the respective collections of stator slots and stator teeth had been shown one less, instead of one more, than the number of rotor slots and rotor poles of the respective collections of rotor slots and rotor poles.

The stator 19 of Fig. 5, though presenting the invention in its simplest form, is nevertheless magnetically unbalanced; and the degree of unbalance will become increased when current flows through the windings that are disposed in the stator slots. The corresponding arrangement of Fig. 6, and any other arrangement having a plurality of collections, on the other hand, is provided with identical magnetic circuits disposed at equally spaced positions on the circumference, and operating on the same principal as that of Fig. 5. Such arrangements are therefore magnetically balanced.

The number of stator teeth and rotor poles of Fig. 5 could, of course, be tripled, instead of merely doubled, as in Fig. 6; and they could be quadrupled, quintupled, and so on. The operation of the tripled, quadrupled, quintupled, and so on, machine, would still be the same as described above in connection with Fig. 5, except that, instead of combining two of the magnetic patterns of Fig. 5 into a single piece of apparatus, as in Fig. 6, three, four, five or any other convenient number of magnetic-flux patterns could be so combined.

According to the modification of the invention illustrated by Fig. 2, the magnetic circuits encircling the stator slots 1 to 18, instead of being provided in an integral core 19, are respectively confined to separate laminated core sections five of which, respectively encircling the stator slots 3 to 7, are respectively shown at 1103 to 1107, held in an integral assembly by means of bolts, rivets or the like 1253 to 1256. These core sections 1103 to 1107 are shown separated by radial air gaps centrally through the respective stator teeth 44 to 47. Whether or not the air gaps are employed, the respective magnetic circuits are substantially complete in themselves, and independent of one another. This construction has the advantage of reduced cost, particularly in large machines. This is because, since the stator core need not be continuous throughout the circumference of the machine, the width of the lamination stock is reduced, its stacking is simplified, and shipment of the machine in sections, and consequent assembly at the installation site, are greatly simplified.

Relative sinusoidal values of the alternating magnetic energy or fluxes encircling the stator slots 1 to 18 will be plotted in Cartesian coordinates. The relative unity or 1.000 peak value of the sine function may represent the peak value attained by each of these alternating magnetic fluxes.

Assuming a clockwise rotation of the rotor 20, the alternating magnetic fluxes, assumed to vary sinusoidally, of the magnetic circuits encircling the stator slots of the positive collection of stator slots 1 to 9 of Figs. 1, 2, 4, 6, 7, 9, 11 and 21, or the single collection of stator slots 1 to 9 of Figs. 3, 5 and 8, are represented in Fig. 10, in their true polarity, by the curves $\phi_1$ to $\phi_9$. The origin of coordinates is so chosen, in Fig. 10, that, at a particular instant of time, representing the zero-degree magnetic angle, the positive relative peak amplitude, assumed unity or 1.000, of the curve $\phi_5$, representing the alternating magnetic flux of the magnetic circuit encircling the centrally disposed stator slot 5, lies on the axis of ordinates. The alternating magnetic fluxes of the magnetic circuits encircling diametrically opposed stator slots, representing the negative collection of stator slots of the two-collection assembly of Figs. 1, 2, 4, 6, 7, 9, 11, 14 to 16 and 21, are duplicates. The magnetic flux of the magnetic circuit encircling the stator slot 10, as an illustration, is precisely the same as the magnetic flux of the magnetic circuit encircling the stator slot 1, and it is represented by the same curve $\phi_1$.

The magnetic energy or magnetic flux, of either the single-collection assembly of Figs. 3, 5 and 8 or the two-collection assembly of Figs. 1, 2, 4, 6, 7, 9, 11, 14 to 16 and 21, will be referred to herein as a magnetic pattern. It represents the aggregate of an assembly of one or more collections of individual alternating magnetic fluxes, each collection being associated with a total range of phase displacement, disregarding the alternately opposite polarity, of substantially $\pi$ or 180 magnetic degrees. In response to the rotation of the rotor 20, the magnetic pattern appears uniformly to rotate in the direction of the phase sequence of the alternating magnetic fluxes. The rotation, however, is apparent only, and not real. The invention does not depend for its operation upon a rotating magnetic field.

The eighteen stator slots 1 to 18 are all shown, at the right of Figs. 1, 4, 6, 7, 9, 11, 14 to 16 and 21, provided with a common radial reference zero line or axis +Z.L., disposed midway between the stator slots 18 and 1. The angular positions of the stator slots 1 to 18 may be measured with respect to this radial reference zero line or axis +Z.L., in geometric sequence, counterclockwise, along the circumference of the circle of the stator 19. In Fig. 22, the reference zero line +Z.L. is shown extending through the stator slot 146.

This reference zero line +Z.L. may serve also as the reference zero line of the positive collection of nine stator slots 1 to 9. This reference zero line +Z.L. may therefore be referred to as a positive reference zero line. The negative collection of nine stator slots 10 to 18 may also be provided with a common radial reference zero line, which may be referred to as a negative radial reference zero line —Z.L. It is shown in Figs. 1, 4, 6, 7, 9, 14 to 16 and 21 disposed midway between the stator slots 9 and 10, diametrically oppositely alined with the positive radial reference zero line +Z.L.

The two-collection assembly of eighteen stator slots 1 to 18, as well as the positive collection of stator slots 1 to 9, are all similarly shown at the top of Figs. 1 to 9, 11 and 21 provided with a common positive radial reference center line + ₵, extending through the center of, and alined with, the stator slot 5. The negative collection of nine stator slots 10 to 18 are shown similarly provided with a negative radial reference center line — ₵ through the center of, and alined with, the stator slot 14. The stator slot 5 may be referred to as the central stator slot of the positive collection of stator slots 1 to 9, as well as of the two-collection assembly of stator slots 1 to 18, and the stator slot 14 may be referred to as the central stator slot of the negative collection of stator slots 10 to 18.

Since the rotor slot 25 is shown radially alined exactly with the central stator slot 5 and the positive reference center line + ₵, it may be adopted as the reference or central rotor slot of the positive collection of rotor slots 21 to 28 and of the two-collection assembly of rotor slots 21 to 36. As similar considerations apply to the negative collection of rotor slots 29 to 36, the rotor slot 33, similarly radially alined with the central stator slot 14 and the negative reference center line — ₵, may similarly be adopted as the reference or central rotor slot of the negative collection of rotor slots 29 to 36.

The positive and negative radial reference center lines + ₵ and — ₵ are naturally at right angles to the positive and negative radial reference zero lines +Z.L. and —Z.L., and the various assemblies and collections are disposed symmetrically with respect to the respective center lines + ₵ and — ₵ and zero lines +Z.L. and —Z.L.

It is not necessary that any particular reference center line ₵ be exactly alined with the center of a stator slot, or that any particular reference zero line Z.L. be disposed exactly midway between two stator slots. The reference center and zero lines may assume any orientation, so long only as they meet the requirements that the positive and negative reference center lines be alined, that the positive and negative reference zero lines also be alined, and that the alined reference center lines be disposed at right angles to the alined reference zero lines.

It will conduce to clarity of description to associate the various stator slots with reference geometric-sequence or slot angles. The geometric-sequence or slot angle associated with any particular stator slot, such as the stator slot 2 of Fig. 6, marked S, may be defined as the angle subtended by that stator slot at the center of the circle, measured counterclockwise from the positive reference zero line +Z.L., in the direction of increasing stator slot numbers 1 to 18. The geometric-sequence or slot angles associated with the two-collection assembly of stator slots 1 to 18, measured with respect to the positive reference zero line +Z.L., are 10, 30, 50, 70, 90, 110, 130, 150, 170, 190, 210, 230, 250, 270, 290, 310, 330 and 350 degrees, respectively. The geometric-sequence or slot angles of the stator slots of the positive collection of stator slots 1 to 9, measured with respect to the same positive reference zero line +Z.L., are respectively 10, 30, 50, 70, 90, 110, 130, 150 and 170 degrees.

The nine stator slots 1 to 9 of the positive collection of stator slots or 10 to 18 of the negative collection of stator slots may be regarded as representing a practical approximation to a collection of stator slots associated with geometric-sequence or slot angles extending throughout the theoretical range zero to $\pi$ or 180 degrees; and the eighteen stator slots 1 to 18 of the two-collection assembly of stator slots may similarly be regarded as representing a practical approximation to a two-collection assembly of stator slots associated with geometric-sequence or slot angles extending throughout the theoretical range zero to $2\pi$ or 360 degrees.

Since the geometric position of each magnetic circuit is the same as that of the stator slot which it encircles, the geometric-sequence angles thus associated with the stator slots 1 to 18 may also be associated with the respective magnetic circuits.

It is desirable, however, as will be better understood later, to have some method of reference for the stator slots and the stator magnetic circuits that is not dependent on geometric angles or geometric positions. For this purpose, the stator slots and the magnetic circuits may be associated also with phase-sequence angles corresponding to the previously described geometric-sequence or slot angles.

It will be convenient, because it corresponds to the positive geometric reference zero line +Z.L., midway between the stator slots 18 and 1, to select the phase midway between the phases of the alternating magnetic fluxes of the magnetic circuits encircling the stator slots 18 and 1 as the reference phase with respect to which to measure the phase-sequence angles associated with the stator slots 1 to 9 of the positive collection of stator slots, as well as the magnetic circuits encircling those stator slots, and also of the two-collection assembly of stator slots 1 to 18 and the corresponding magnetic circuits. This reference phase may be termed a positive reference phase, and it may be associated with a phase-sequence angle of zero degrees. With this selection of the positive reference phase, the phase-sequence angles of the two-collection assembly of stator slots 1 to 18 and of the magnetic circuits encircling these stator slots are respectively 10, 30, 50, 70, 90, 110, 130, 150, 170, 190, 210, 230, 250, 270, 290, 310, 330 and 350 magnetic degrees behind the positive reference phase respectively the same as their geometric-sequence or slot angles.

Not only has each stator slot of the two-collection assembly of stator slots 1 to 18 thus been associated with a geometric-sequence or slot angle and a phase-sequence angle, but it has also been shown that, in the two-collection assembly, the geometric-sequence or slot angle associated with any particular stator slot is of the same value as that of the phase-sequence angle with which it is associated. They are not the same, however, in an assembly the number of collections of stator slots of which is different from two.

In particular, as an illustrtaion, they are not the same in the single-collection assembly of only nine stator slots 1 to 9 illustrated in Figs. 3, 5 and 8. In the single-collection assembly of Figs. 3, 5 and 8, the total range of phase displacement of $\pi$ or 180 degrees associated with the stator slots 1 to 9 is distributed along the complete circumference of the stator over a total range of $2\pi$ or 360 degrees. The geometric-sequence or slot angles associated with the respective stator slots 1 to 9 are therefore equal to twice the corresponding phase-sequence angles.

Though the geometry of the single-collection assembly of stator slots 1 to 9 of Figs. 3, 5 and 8 is different from that of the two-collection assembly of eighteen stator slots 1 to 18 of Figs. 1, 4, 6, 7, 9, 11 and 21, in that, instead of the geometric angles of the respective stator slots being equal to the corresponding electric angles, they are double the electric angles, the important consideration is that the one-collection assembly of Figs. 3, 5 and 8 is theoretically equivalent to the two-collection assembly of Figs. 1, 4, 6, 7, 9, 11 and 21 in that the electric characteristics are the same in both instances.

The stator 19 of Fig. 4 is shown provided with a polyphase winding comprising eighteen phase windings 1d to 18d respectively wound through the stator slots 1 to 18, each about the corresponding peripheral portion 88 of the stator core 19 between its outer periphery 63 and the bottom 62 of the corresponding stator slot. The stator 19 of Fig. 3 is shown similarly provided with nine phase windings 1d to 9d wound in the stator slots 1 to 9, respectively. The phase windings 1d to 18d are illustrated as like phase windings, identical in all respects, each having two terminals, and all provided with the same number of conductors or turns. They may be referred to as individual concentrated phase windings, to distinguish them from the hereinafter more fully described distributed phase windings. For purposes of theory only, the stator phase windings 1d to 18d are shown wound in alternately opposite directions from stator slot to stator slot. In the practical machine, the same result would be obtained simply by reversing the connections to alternately disposed terminals of these phase windings 1d to 18d.

The voltages induced in the phase windings 1d to 9d of Fig. 3 and 1d to 18d of Fig. 4 are of the same peak amplitude and they are equally phase-displaced over a total range of $\pi$ or 180 degrees and $2\pi$ or 360 degrees, respectively. Assuming a sinusoidal wave form, the voltages induced in the phase windings 1d to 9d may be represented, in their true polarity, by the curves $e_1$ to $e_9$ of Fig. 17. To avoid the confusion that would be introduced by nine additional curves, the voltages induced in the phase windings 10d to 18d of the two-collection assembly of Fig. 4 may be represented by means of the respective vectors $e_{10}$ to $e_{18}$ of Fig. 17. Each of these vectors, positioned on the axis of abscissae at the point at which occurs the corresponding peak unity or 1.000 value, represents a sinusoidal variation of exactly the same type as do the curves $e_1$ to $e_9$.

The terminals of the individual concentrated phase windings 1d to 9d of Fig. 3 and 1d to 18d of Fig. 4 may be connected to corresponding terminals of the respective phases of a polyphase load or a polyphase source of voltage, not shown, respectively of nine and eighteen alternating or cyclically varying phases of equal amplitude that are substantially equally phase-displaced over a total range of phase displacement of $\pi$ or 180 and $2\pi$ or 360 electric degrees, respectively. There are, of course, other ways of connecting the individual concentrated phase windings. For example, by reversing the direction of connection, the terminals of the phase windings 10d to 18d of Fig. 4 may be respectively connected to the terminals of the same phases as the phase windings 1d to 9d. With this latter method of connection, the number of collections, and therefore the number of poles, of the synchronous machine illustrated by Figs. 3, 4 and 7 may be increased without increasing the number of its electric phases.

Voltage outputs having a similar total range of phase displacement may be obtained with any like windings, equal in number to the number of magnetic circuits, equiangularly spaced throughout the periphery. For example, in Fig. 7, the like phase windings 1d to 18d are each shown disposed, not in a separate stator slot, as illustrated in Figs. 3 and 4, but in two adjacently disposed stator slots, thereby encircling the stator tooth disposed between these adjacently disposed stator slots. The stator phase winding 1d, for example, is disposed in the stator slots 1 and 2, thereby encircling the stator tooth 42, and the stator phase winding 2d is similarly disposed in the stator slots 2 and 3, thereby encircling the stator tooth 43. Two adjacently disposed stator phase windings are therefore disposed in each stator slot.

For the purpose of comparing, in other respects, the relative merits of disposing each of the stator phase windings 1d to 18d in a separate slot, as illustrated by Fig. 4, and two adjacently disposed stator slots, as illustrated by Fig. 7, it will be assumed that the same number of conductors is disposed in each stator slot in each of these arrangements. Assuming that the phase windings 1d to 18d are all alike, therefore, they will each have half as many turns in the arrangement of Fig. 7 as in that of Fig. 4. For diagrammatic purposes, each of the stator phase windings is shown in Fig. 7 composed of two turns, thereby providing four conductors in each stator slot.

The voltages induced in the stator slots 1 to 18 of Fig. 7 are exactly the same as the voltages induced in the stator slots 1 to 18 of Fig. 4, though half the voltage induced in each stator slot of Fig. 7 is provided by each of the two phase windings disposed therein. Since the two voltage contributions to each phase winding are displaced 20 degrees, the voltages induced in the phase windings 1d to 18d of Fig. 7 are displaced 10 degrees and they are smaller, although by a very small amount, than the voltages induced in the phase windings 1d to 18d of Fig. 4. From a practical viewpoint, either arrangement provides voltages of substantially the same, although not sinusoidal, wave form, and substantially the same peak amplitude, and these voltages are equally phase-displaced over a total range equal to $2\pi$ or 360 electric degrees.

The currents through the phase windings 1d to 18d of both arrangements provide substantially like reactive magneto-motive forces, similarly phase-displaced, to the stator slots 1 to 18.

The synchronous generator or motor of the present invention may be provided with a distributed polyphase winding that, as will be explained hereinafter, may be provided with two, three, or any other desired number of distributed phase windings.

The distributed phase windings of the distributed polyphase winding are illustrated as comprising conductors or turns wound in the stator slots around respective portions of the stator core 19. Only those portions of the conductors or turns that are disposed inside the stator slots, of course, are effective for voltage-inducing purposes. The function of the remaining parts of the conductors or turns, on the outside of the respective stator slots, is merely to complete the electric connections between the portions of the conductors or turns inside the stator slots. It will conduce to clarity, during the theoretical discussion, to refer merely to the number of conductors of each distributed phase winding disposed in each stator slot. For definiteness, the conductors of any distributed phase winding disposed in one particular stator slot may be referred to as a conductor group.

Each of the distributed phase windings of this polyphase winding comprises a number of conductor groups equal to the number of magnetic circuits or stator slots, one of the conductor groups of each such distributed phase winding being disposed in each magnetic circuit or stator slot. Each magnetic circuit therefore encircles a conductor group of each of the distributed phase windings. This description is general, to include cases where particular conductor groups may have zero conductors or turns.

The conductor groups of the distributed phase windings are not shown identical. They have different numbers of conductors or turns, varying progressively from stator slot to stator slot. The fact that the number of conductors or turns comprising the conductor groups disposed in the stator slots varies from stator slot to stator slot is diagrammatically indicated in the drawings in various ways. It is indicated by numbers, not greater than unity or 1.000; also by showing the conductor groups or windings as of different thickness; and further by showing the conductor groups or windings disposed in some of the stator slots, either in section or otherwise, as containing more conductors or turns than other conductor groups or windings disposed in other stator slots.

The numbers of conductors of the conductor groups of the phase 1 distributed phase winding are shown varying substantially as the absolute or positive values of the sine function over an angular range equal to $\pi$ or 180 degrees times the number of collections of stator slots. The numbers of conductors of the conductor groups of the other distributed phase windings are shown varying in a similar manner, but the respective angular ranges of the said sine function are displaced by angular amounts substantially equal to the phase displacement of the respective phase windings. Improved performance may, however, be obtained even though the conductors of the conductor groups are not distributed strictly according to the sine function. The distribution may, for example, be in accordance with substantially the absolute or positive values of other alternating functions the values of which, like the values of the sine function, progressively: first increase from zero to a maximum in the interval zero to $\pi/2$ or 90 degrees; then decrease, through zero to a minimum in the interval $\pi/2$ or 90 degrees to $3\pi/2$ or 270 degrees; and, finally, increase again to zero in the interval $3\pi/2$ or 270 degrees to $2\pi$ or 360 degrees.

In Figs. 1, 5, 6, 8, 9, 11, 14 and 21, the numbers of conductors of the conductor groups of the phase 1 distributed phase winding are shown varying substantially as the absolute or positive values of the sine of the previously described phase-sequence angles. The points on the circumference where the numbers of conductors of the conductor groups of the phase 1 distributed phase winding are theoretically proportional to the values of the sine of 0, $\pi/2$ or 90, $\pi$ or 180, and $3\pi/2$ or 270 degrees are accordingly indicated by the positive reference zero line $+Z. L.$, the positive reference center line $+ ¢$, the negative reference zero line $-Z. L.$ and the negative reference center line $- ¢$, respectively.

With this selection of reference lines, the numbers of conductors of the phase 1 distributed phase winding disposed in the positive collection of stator slots 1 to 9 of Figs. 1, 5, 6, 8, 9, 11, 14 and 21 and the negative collection of stator slots 10 to 18 of Figs. 1, 6, 9, 14 and 21 are respectively proportional to 0.174, 0.500, 0.766, 0.940, 1.000, 0.940, 0.766, 0.500 and 0.174, the absolute or positive values of the sine of the progressively increasing angles 10, 30, 50, 70, 90, 110, 130, 150 and 170 degrees, corresponding to the positive collection, and 190, 210, 230, 250, 270, 290, 310, 330 and 350 degrees, corresponding to the negative collection. In the two-collection assembly of Figs. 1, 6, 9, 14 and 21, these angles are equal to the geometric-sequence or slot angles subtended by the respective stator slots 1 to 18 at the center of the circle, measured counterclockwise from the positive reference zero line $+Z. L.$ In Figs. 1, 9, 11, 14 to 16 and 21, the conductor groups are shown provided by coils or windings disposed in the various stator slots 1 to 18. The coils or windings of the phase 1 distributed phase winding of Figs. 1, 9, 14 and 21 are shown in section in Fig. 6; and Fig. 5 illustrates the corresponding single-collection arrangement. The coils or windings, like the conductor groups previously described, are indicated by decimal fractions which also indicate the relative numbers of turns of these coils or windings. As each conductor group may thus be constituted of more than one coil or winding, the relative number of conductors of a conductor group is necessarily the sum of the relative numbers of turns of the coils or windings of which that conductor group is constituted.

In Figs. 1, 6, 9, 11, 14 to 16 and 21, the conductor groups of the phase 1 distributed winding disposed in the central stator slots 5 and 14 are shown each provided with the maximum relative number of conductors, represented as $0.500+0.500=1.000$ or unity. They are indicated in Fig. 6 as provided with ten conductors. A similar showing appears in the central stator slot 5 of Figs. 5 and 8. The conductor groups of the phase 1 distributed phase winding disposed in the stator slots 4, 6, 13 and 15 are similarly shown each provided with $7+2=9$ conductors, to represent approximately the relative number $0.766+0.174=0.940$. Though the ratio of 10 to 9 is somewhat less than the ratio of 1.000 to 0.940, the approximate diagrammatic showing of ten conductors to represent the 1.000 conductor group and of nine conductors to represent the 0.940 conductor group serves well enough for illustrative purposes.

The conductor groups of the phase 1 distributed phase winding disposed in the stator slots 3, 7, 12 and 16 are similarly indicated as provided with seven conductors to represent approximately the value 0.766, the conductor groups of the phase 1 distributed phase winding disposed in the stator slots 2, 8, 11 and 17 with five conductors to represent the value 0.500, and the conductor groups of the phase 1 distributed phase winding disposed in the stator slots 1, 9, 10 and 18 with two conductors to represent approximately the value 0.174. The ratios 7:5:2 are sufficiently near to the ratios 0.766:0.500:0.174 to serve well enough for illustrative purposes.

To provide substantially equal phase displacement of the three distributed phase windings of Figs. 1, 5, 6, 8, 11 and 14 to 16, the angular ranges corresponding to the phase 2 and phase 3 distributed phase windings are respectively displaced with respect to the total angular range corresponding to the phase 1 distributed phase winding substantially $2\pi/3$ or 120 degrees and $4\pi/3$ or 240 degrees in the direction of the phase sequence. In Fig. 21, on the other hand, the total angular range corresponding to the phase 2 distributed phase winding is displaced $\pi/2$ or 90 degrees in the direction of the phase-sequence to provide a two-phase arrangement. In both cases, and in all similar such cases, the angular displacement with respect to one another of the total angular ranges corresponding to the respective phase windings is an angular amount substantially equal to the phase displacement of the respective phase windings of the polyphase winding.

Accordingly, to the 0 to $2\pi$ or 360 degree total angular range corresponding to the phase 1 distributed phase winding, there corresponds, in Figs. 1, 6, 9, 11 and 14 to 16, the total angular ranges (0–120) to ($2\pi$ or 360—120) degrees and (0—240) to ($2\pi$ or 360—240) degrees for the phase 2 and phase 3 distributed phase windings, respectively, and, in Fig. 21, the total angular range (0–90) to ($2\pi$ or 360—90) degrees for the phase 2 distributed winding. Corresponding considerations apply to distributed phase windings of single-collection arrangements.

The conductor groups of the phase 2 and phase 3 distributed phase windings of Figs. 1, 6, 9 and 14 to 16, similarly distributed over their respective total angular ranges, are duplicates of the conductor groups of the phase 1 distributed phase winding, but respectively displaced counterclockwise $2\pi/3$ or 120 and $4\pi/3$ or 240 degrees, respectively. They are duplicates, however, only because the particular number 18 of magnetic circuits or stator slots is divisible by three, the particular number of distributed phase windings.

In Fig. 21, wherein the displacement of the total angular ranges is only $\pi/2$ or 90 degrees, because, in this case, the number 18 of stator slots or magnetic circuits is not divisible by four, the conductor groups of the phase 2 distributed phase winding are different, although arrived at in exactly the same manner. In Fig. 21, the decimal fractions 0.643+0.342 or 0.985, 0.866, 0.643, 0.342, 0.000, 0.342, 0.643, 0.866 and 0.643+0.342 or 0.985, respectively indicating the numbers of conductors of the conductor groups of the phase 2 distributed phase winding disposed in the stator slots 1 to 9 and 10 to 18, are respectively the absolute or positive numerical values of the sine of 280, 300, 320, 340, 360, 20, 40, 60 and 80 degrees and 100, 120, 140, 160, 180, 200, 220, 240 and 260 degrees, the geomettric-sequence or phase-sequence angles associated with the respective stator slots decreased by $\pi/2$ or 90 degrees, the displacement of the respective total angular ranges.

A conductor group of each phase winding is thus disposed in each stator slot. In Fig. 21, the stator slots 5 and 14, representing a limiting case, are shown unprovided with conductor groups corresponding to the phase 2 distributed winding. This, however, is only an apparent, and not a real, exception to the rule. It would occur in all such cases where the angle corresponding to that conductor group is equal to zero or a multiple of $\pi$ or 180 degrees. As required by the sine law, such a conductor group would have zero conductors, and would be indicated as 0.000. With this explanation, and including this limiting case, it may be said that each phase winding has a number of conductor groups substantially equal to the number of stator slots in the assembly of stator slots, that a conductor group of each phase winding is disposed substantially in each stator slot and in the magnetic circuit encircling such stator slot, and that the number of conductors of the conductor groups of each distributed phase winding varies substantially as the absolute values of the sine over a total range substantially equal to $\pi$ or 180 degrees multiplied by the number of collections of magnetic circuits or stator slots, at angular increments each substantially equal to the total range divided by the number of magnetic circuits or stator slots.

In the synchronous machine of the present invention, the element of non-uniformity, arising out of the fact that the numbers of conductors of the conductor groups of any particular distributed phase winding varies from stator slot to stator slot, tends to become compensated for when the synchronous machine is provided with a polyphase winding comprising a plurality of such distributed phase windings, the respective total ranges of which are displaced with respect to one another, as before explained, an angular amount substantially equal to the phase displacement of the phase windings.

The direction of winding of the conductors of the conductor groups of each distributed phase winding changes alternately with, and with the negative of, the sign of the sine, the function that determines the numbers of conductors of the respective conductor groups. For uniformity, and in accordance with this method of winding, the direction of winding is shown herein changing with the sign of the said sine in the odd-numbered stator slots and with the negative of the said sine in the even-numbered stator slots.

The conductor groups of each distributed phase winding are connected in series along the above-described directions of winding into the respective phase-winding circuits. Although the conductor groups of each distributed phase winding may be connected in series in any desired sequence, for uniformity and simplicity, they are shown herein connected into the respective phase-winding circuits in the order of their geometric or phase sequence. The directions of winding will be readily understood following a discussion of the respective phase-winding circuits.

As illustrated in Fig. 9, a continuous or endless coil or winding, marked 0.174, is shown looped in the stator slots 1 and 4, so as to enclose the stator teeth 42, 43 and 44. This 0.174 coil or winding is shown in Fig. 9 as the least thick of the coils or windings and, in Figs. 5 and 6, by a cross-sectional showing representing it as composed of only two conductors.

A similar continuous winding, marked 0.500, is shown looped in the stator slots 2 and 5, so as to enclose the stator teeth 43, 44 and 45. The fact that it is composed of a larger number of conductors than the 0.174 winding is indicated in Fig. 9 by a showing of increased thickness and, in Figs. 5 and 6, by a cross-sectional showing representing it as composed of five conductors.

Another similar continuous winding, marked 0.766, is shown looped in the stator slots 3 and 6, so as to enclose the stator teeth 44, 45 and 46. This coil or winding is indicated in Fig. 9 by a still thicker showing and, in Figs. 5 and 6, by showing it, in section, as composed of seven conductors.

A 0.174 winding is shown looped also in the stator slots 6 and 9, so as to enclose the stator teeth 47, 48 and 49. This winding is similar, in all respects, to the 0.174 winding looped in the stator slots 1 and 4, enclosing the stator teeth 42, 43 and 44. Corresponding similarly to the 0.500 winding looped in the stator slots 2 and 5, there is shown also a 0.500 winding looped in the stator slots 5 and 8, so as to enclose the stator teeth 46, 47 and 48. Corresponding to the 0.766 winding looped in the stator slots 3 and 6, there is shown also a similar 0.766 winding looped in the stator slots 4 and 7, so as to enclose the stator teeth 45, 46 and 47.

The relative number of conductors in the conductor groups disposed in the stator slots 1 and 9 becomes thus represented by the number 0.174. The relative number of conductors in the conductor groups disposed in the stator slots 2 and 8 becomes represented by the number 0.500. The relative number of conductors in the conductor groups disposed in the stator slots 3 and 7 becomes similarly represented by the number 0.766, that in the conductor groups disposed in the stator slots 4 and 6 by the number 0.766+0.174 or 0.940, and that in the conductor groups disposed in the stator slot 5 becomes represented by the number 0.500+0.500 or unity. As before stated, this represents the maximum relative number of conductors.

In accordance with this arrangement, therefore, the various windings add their contributions to yield the correct number of conductors in the conductor groups disposed in the stator slots 1 to 9, so as to effect the desired variation according to the sine law.

The coils or windings of the phase 1 distributed winding disposed in the stator slots 10 to 18 are respectively exact duplicates of the coils or windings already described as disposed in the stator slots 1 to 9.

It is convenient to distinguish between the relative number of turns or conductors per coil or winding and the relative number of conductors per stator slot. Reference has been made above to the 0.174, 0.500 and 0.766 coils or windings. These values represent still further, however, the relative number of conductors in each of the stator slots 1, 2 and 3, respectively; and also in the stator slots 9, 8 and 7, the stator slots 10, 11 and 12, and the stator slots 18, 17 and 16, respectively. The relative nnumber of conductors in each of the stator slots 4, 6, 13 and 15, however, is 0.174+0.766, or 0.940; and the relative number of conductors in the stator slots 5 and 14 is 0.500+0.500, or 1.000.

The important consideration, of course, is, not the relative number of turns per coil or winding, but, rather, the relative number of conductors per stator slot. In the description above, it was through the expedient of choosing properly the relative number of turns per coil or winding, and properly looping them in the proper stator slots, that the proper relative number of conductors per slot was arrived at.

That, however, constituted only one expedient for arriving at the desired result. A further example, as another illustration only, is afforded by Fig. 11. In this Fig. 11, the relative number of turns per coil of the phase 1 sinusoidally distributed phase winding is represented by the 0.174, 0.326, 0.440, 0.500, 0.500, 0.440, 0.326 and 0.174 windings. A 0.174 winding is shown disposed in the stator slots 1 and 2, so as to enclose the stator tooth 42; a 0.326 winding in the stator slots 2 and 3, so as to enclose the stator tooth 43; a 0.440 winding in the stator slots 3 and 4, so as to enclose the stator tooth 44; and a 0.500 winding in the stator slots 4 and 5, so as to enclose the stator tooth 45. A 0.174 winding is disposed also in the stator slots 8 and 9, so as to enclose the stator tooth 49; a 0.326 winding in the stator slots 7 and 8, so as to enclose the stator tooth 48; a 0.440 winding in the stator slots 6 and 7, so as to enclose the stator tooth 47; and a 0.500 winding in the stator slots 5 and 6, so as to enclose the stator tooth 46. These windings of the stator slots 1 to 9 are duplicated in the slots 10 to 18, though not shown in Fig. 11.

The relative number of conductors in the stator slots 1 and 9, therefore, is 0.174; the relative number of conductors in the stator slots 2 and 8 is 0.174+0.326, or 0.500; the relative number of conductors in the stator slots 3 and 7 is 0.326+0.440, or 0.766; the relative number of conductors in the stator slots 4 and 6 is 0.440+0.500, or 0.940; and the relative number of conductors in the stator slot 5 is 0.500+0.500, or 1.000.

The same relative numbers of conductors per slot, 0.174, 0.500, 0.766, 0.940 and 1.000, is thus arrived at with the employment of the relative number of turns per winding or coil shown in Fig. 11 that was obtained with the relative number of turns per winding or coil illustrated in Figs. 1, 5, 6, 8, 9, 21 and phase 1 of Fig. 14 merely by a different disposition of the coils or windings in the various stator slots.

In the arrangement of Fig. 11, as in that of Figs. 1, 5, 6, 8, 9, 21 and phase 1 of Fig. 14, moreover, the coils or windings are shown endless or continuous. It will be obvious, however, that the desired relative number of conductors per slot may be arrived at by other types of windings also. The above examples do not, of course, exhaust the methods of distributing the conductor groups in the various stator slots.

It having now been explained how to distribute the conductors of a phase winding so that the number of conductors in the conductor groups thereof shall vary according to the desired sine function, it is next in order to explain how to connect these conductor groups along the said directions of winding into the distributed armature phase winding, specifically illustrated as a stator phase winding. This may be effected in many ways. One series connection, as an example, will now be described in connection with Fig. 9. In Fig. 9, arrows are drawn to indicate the direction of winding both through the stator slots and through the intermediate conductors. These same arrows may be considered hereinafter to indicate also the directions of the induced component voltages and the effective or composite voltage at the instant when the component voltage induced in the central stator slot 5 is at its positive peak amplitude. The arrows may also be considered to indicate the direction of the current due to the composite voltage, although this current may be displaced in phase due to the power factor of the load.

The series circuit of the phase 1 distributed armature phase winding is diagrammatically shown, in Fig. 9, extending from a line terminal 116, by way of a line conductor 92, through the 0.174 coil or winding disposed in the stator slots 1 and 4, and by way of a conductor 93, to one end of the 0.500 winding disposed in the stator slots 5 and 2. The series distributed phase winding continues through this 0.500 winding, by way of a conductor 94, through the 0.766 winding disposed in the stator slots 3 and 6, by way of a conductor 95, through the further 0.766 winding disposed in the stator slots 7 and 4, and, by way of a conductor 96 to one end of the 0.500 winding disposed in the stator slots 5 and 8. The circuit of the series distributed armature phase winding continues through the 0.500 winding disposed in the stator slots 5 and 8, by way of a conductor 97, through the 0.174 winding disposed in the stator slots 9 and 6.

This completes the circuit of the series phase 1 distributed phase winding disposed in the stator slots of the positive collection of stator slots 1 to 9. As indicated by the arrows of Fig. 9, the conductors 93, 94, 95, 96 and 97 connect the 0.766, 0.500 and 0.174 windings, just described, to provide alternately opposite direction of winding from stator slot to stator slot. The directions in which the series circuit is traced, from stator slot to stator slot, are such that the direction of winding of the conductor groups in the odd-numbered stator slots is in an assumed positive direction, downward, away from the reader and the direction of winding of the conductor groups disposed in the even-numbered stator slots is in the opposite or negative direction, upward, toward the reader.

A conductor 98 is shown in Fig. 9 connecting together the 0.174 windings disposed in the stator slots 9 and 6 and the stator slots 10 and 13, but with a reversal in the direction of connection. From here on, the connections constitute a repetition of the connections already described. The series phase 1 distributed armature phase-winding circuit continues through the 0.174 winding disposed in the stator slots 10 and 13, by way of a conductor 99, through the 0.500 winding disposed in the stator slots 14 and 11, by way of a conductor 100, through the 0.766 winding disposed in the stator slots 12 and 15, by way of a conductor 101, through the 0.766 winding disposed in the stator slots 16 and 13, by way of a conductor 102, through the 0.500 winding disposed in the stator slots 14 and 17, and, by way of a conductor 103, through the 0.174 winding disposed in the stator slots 18 and 15, back to a line conductor 104, connected to a line terminal 117. As indicated by the arrows of Fig. 9, the directions of winding are again reversed alternately, from stator slot to stator slot, but, this time, in such manner that the directions of winding in the even-numbered stator slots are positive, and those in the odd-numbered stator slots are negative.

The 0.174 winding disposed in the stator slots 10 and 13 is so connected into the series phase-winding circuit, by the conductor 98, that the direction of winding in the stator slot 10, as indicated by the arrows of Fig. 9, is in the same positive direction as the direction of winding of the 0.174 coil or winding in the stator slot 9. The directions of winding in the end slots 9 and 10 of the respective positive and negative collections are therefore in the same direction, and not in opposite directions.

Diametrically oppositely disposed conductor groups become duplicated, not only in magnitude, but also in direction, when the number of stator slots in each collection of stator slots is odd; and this renders it possible, as already described in connection with the two-collection assembly of Fig. 6, to operate the collections independently. It is because of this fact, and the fact that the number of poles of each collection of poles is even, that it is possible to provide an alternator in accordance with the present invention that embodies only a single-collection assembly, or an assembly of an odd number of collections, of stator slots.

The series circuit of the phase 1 distributed armature phase winding diagrammatically illustrated in Fig. 11 may similarly be traced, in the direction of the respective arrows, from the line terminal 116, by way of the line conductor 92, through the 0.174 winding disposed in the stator slots 1 and 2, by way of a conductor 119, through the 0.326 winding disposed in the stator slots 2 and 3, by way of a conductor 120, through the 0.440 winding disposed in the stator slots 3 and 4, by way of a conductor 121, through the 0.500 winding disposed in the stator slots 4 and 5, by way of a conductor 122, through the 0.500 winding disposed in the stator slots 5 and 6, by way of a conductor 123, through the 0.440 winding disposed in the stator slots 6 and 7, and, by way of a conductor 124, through the 0.326 winding disposed in the stator slots 7 and 8, by way of a conductor 125, through the 0.174 winding disposed in the stator slots 8 and 9, to the conductor 98. The connections, not shown, from the conductor 98 to the line conductor 104 and the line terminal 117 will be a repetition of these connections. Here, again, the arrows clearly show the alternate reversals of the directions of winding of the successively disposed conductor groups.

The single phase distributed winding described in connection with Fig. 9 may represent the phase 1 distributed winding of either the three-phase arrangement of Fig. 1 or of the two-phase arrangement of Fig. 21. In Fig. 14, it is shown developed into a plane, in order the better to illustrate its relation, in Fig. 1, to the phase 2 and phase 3 windings, respectively illustrated in the two accompanying figures, Figs. 15A and 15B and 16A and 16B.

The phase 2 and phase 3 distributed windings, in addition to having identical conductor groups respectively corresponding to those of the phase 1 distributed winding, as previously described, are shown in Figs. 1, 15A and 15B and 16A and 16B provided also with identical connecting conductors and line conductors, respectively corresponding to those of the phase 1 distributed winding, displaced $2\pi/3$ or 120 and $4\pi/3$ or 240 degrees counterclockwise, respectively.

In the same way that the conductors 93 to 103 connect the windings of phase 1 in series to the conductors 92 to 104, the windings of phase 2 may be connected in series, by similar conductors, that are therefore represented in Figs. 1 and 15 by the same reference numerals, but augmented by 100; and the windings of phase 3 may be similarly series-connected by similar conductors that are represented in Figs. 1 and 16 by the same reference numerals, but augmented by 200.

The conductors 198 and 298 serve the same function for phases 2 and 3 that the conductor 98 does for phase 1. They connect together the intermediately disposed 0.174 windings of the respective assemblies corresponding to phase 2 and 3.

In Figs. 1 and 14 to 16, the line conductor 92 of phase 1 and the line conductor 304 of phase 3 are shown connected together to the common line terminal 116, the line conductor 192 of phase 2 and the line conductor 104 of phase 1 to a common terminal 117, and the line conductor 292 of phase 3 and the line conductor 204 of phase 2 to the common line terminal 118.

This provides a delta connection, as appears from the schematic of Fig. 12. By connecting together the conductors 104, 204 and 304, and connecting the conductors 92, 192 and 292 to the respective line terminals 116, 117 and 118, however, a Y connection may be obtained, as illustrated schematically in Fig. 13.

The line terminals 116, 117 and 118 constitute the line terminals of the three-phase machine.

The conductor groups of the phase 2 distributed winding of the two-phase arrangement of Fig. 21, previously described as different from the conductor groups of the phase 1 distributed winding, may be connected into a somewhat similar phase winding. This phase winding, corresponding to phase 2, may be traced, in Fig. 21, from the line terminal 217, by way of a conductor 392, through a 0.342 winding disposed in the stator slots 6 and 9 and encircling the stator teeth 47, 48 and 49, by way of a conductor 393, through a 0.643 winding disposed in the stator slots 7 and 10 and encircling the stator teeth 48, 49 and 50, by way of a conductor 394, through an 0.866 winding disposed in the stator slots 8 and 11, and encircling the stator teeth 49, 50 and 51, by way of a conductor 395, through a 0.643 winding disposed in the stator slots 9 and 12, and encircling the stator teeth 50, 51 and 52, and, by way of a conductor 396, through a further 0.342 winding disposed in the stator slots 10 and 13, and encircling the stator teeth 51, 52 and 53.

The circuit of the phase 2 distributed phase winding of Fig. 21 continues, by way of a conductor 397, through the conductor groups disposed in the stator slots 15 to 18 and 1 to 4, which have been described as duplicates of the conductor groups disposed in the stator slots 6 to 13. The conductor 397 connects the 0.342 winding disposed in the stator slots 10 and 13 to a 0.342 winding disposed in the stator slots 15 and 18, and encircling the stator teeth 56, 57 and 58. The circuit of the phase 2 distributed winding of Fig. 21 continues, by way of a conductor 398, through a 0.643 winding disposed in the stator slots 16 and 1, encircling the stator teeth 57, 58 and 41; by way of a conductor 399, through a 0.866 winding disposed in the stator slots 17 and 2, encircling the stator teeth 58, 41 and 42; by way of a conductor 400, through a 0.643 winding disposed in the stator slots 18 and 3, encircling the stator teeth 41, 42 and 43; and, by way of a conductor 401, through a 0.342 winding disposed in the stator slots 1 and 4, encircling the stator teeth 42, 43 and 44, to the line conductor 402, connected to the line terminal 218.

The connections of this circuit also provide alternately opposite directions of winding from stator slot to stator slot, with a reversal of connections, where the sine changes sign, through the medium of the conductor 397. As the phase 1 distributed winding is connected through the line conductors 92 and 104 to the terminals 216 and 217, respectively, the terminals 216, 217 and 218 constitute the terminals of the two-phase machine, the terminal 217 being the common terminal for the two phases.

As illustrated by the phase 2 distributer winding of Fig. 21, by orienting the reference zero lines Z. L. so that they are alined, each with a stator slot, both the number of actual conductor groups and the number of windings is reduced. In practice, it would also be advantageous to select a number of stator slots which would provide like windings for the two phases. For the two-phase two-collection arrangement, this would be a number divisible by four.

It will be first assumed that, in each stator slot, there is disposed a conductor group of the same number of turns or conductors, and that these conductor groups, like the individual concentrated windings of Figs. 3 and 4, are wound in alternately opposite directions through the stator slots 1 to 18. This number of turns or conductors will hereinafter be referred to as the unit number of turns or conductors, and the conductor group embodying such unit number of turns or conductors will be referred to as a unit conductor group.

The equal alternating voltages induced in the unit conductor groups disposed in the various stator slots 1 to 18 may be termed unit voltages, and their peak amplitudes may also be taken as unity. Assuming the unit voltages to vary sinusoidally, they may be represented by the curves and vectors $e_1$ to $e_{18}$ of Fig. 17, which heretofore represented the voltages induced in the separate like phase windings $1d$ to $18d$ of Figs. 3 and 4.

In each distributed-phase-winding conductor group, a voltage will be induced proportional to the number of conductors or turns in the conductor group. Each such induced voltage, for reasons which will become apparent, will be referred to as a component voltage.

Referring to Fig. 18, the component voltage induced in the conductor group disposed in the stator slot 1, represented by the sinusoid $E_1$, is equal to the corresponding unit voltage $e_1$ multiplied by the sine of the 10 degree phase-sequence angle associated with the stator slot 1, or $$E_1 = e_1 \sin 10°$$

The component voltage induced in the conductor group disposed in the stator slot 2, represented by the sinusoid $E_2$, is similarly equal to the corresponding unit voltage $e_2$ multiplied by the sine of the 30 degree phase-sequence angle associated with the stator slot 2, or $$E_2 = e_2 \sin 30°$$

and so on.

Since the number of conductors of the conductor groups of the stator slots varies as the sine of the corresponding phase-sequence angle, the peak amplitudes are each respectively shown in Fig. 18 as equal to the peak amplitude of the alternating unit voltage induced in the said unit number of conductors multiplied by the sine of the corresponding phase-sequence angle.

The component voltages induced in the negative collection of stator slots 10 to 18 are duplicates of those induced in the positive collection of stator slots 1 to 9, and will be represented by sinusoidal curves that are duplicates of, and superposed upon, the respective sine curves $E_1$ to $E_9$.

The component voltages induced in the conductor groups disposed in the stator slots of the single collection of stator slots 1 to 9, represented by the curves $E_1$ to $E_9$, respectively, will add, in the series distributed phase-winding circuit described, to produce the resultant voltage represented by the curve $E_R$ of Fig. 18. This voltage addition may be expressed by the equation $$E_R = E_1 + E_2 + E_3 + E_4 + E_5 + E_6 + E_7 + E_8 + E_9 \quad (1)$$

By substitution, this resultant voltage may be expressed, in terms of the original unit voltages, as $$E_R = e_1 \sin 10° + e_2 \sin 30° + e_3 \sin 50° \ldots + e_9 \sin 170° \quad (2)$$

The analytical treatment will now be taken up in connection with the more general problem of a stator core 19 having a two-collection assembly of $n$ stator slots and, therefore, with the $n$ conductor groups of the phase 1 distributed phase winding respectively disposed therein, and also with the alternating component voltages induced in those conductor groups, respectively, represented by sinusoids of the nature illustrated by Fig. 18. It will therefore be assumed, in Fig. 19, that the range $$x = 2\pi$$

on the X axis of abscissae, has been divided up into $n$ equal intervals. It will be assumed also that the ordinates of the component sinusoidal curves of Fig. 19 are each zero, changing from negative to positive, at $$x = m$$

where $m$ is any integer from 1 to the total number $n$.

Let the sine curve representing both the unit voltage $e_5$ and the component voltage $E_5$ of Fig. 19 be represented by the equation $$y = \sin x$$

Then the equation of the $m$th sine curve, representing the alternating component voltage induced in the conductor group disposed in the $m$th stator slot, is $$y = \cos \frac{2\pi}{n} m \sin\left(x - \frac{2\pi}{n} m\right)$$

The equation of the resultant composite curve representing the addition of all these component sine curves is therefore equal to the sum of the individual equations of these component sine curves and this reduces to $$E_R = \frac{n}{2} \sin x \quad (3)$$

In the phase 1 distributed phase winding comprising two collections of conductor groups illustrated in Figs. 1, 6, 9, 11, 14 to 16 and 21, therefore, the alternating component voltages induced in the various conductor groups will add their contributions to produce a sinusoidal resultant composite voltage $E_R$ of the same frequency and phase as either the alternating unit voltage or the component voltage induced in the central stator slot 5, in Figs. 1, 6, 9, 11, 14 to 16 and 21. The peak amplitude of this sinusoidal resultant composite voltage $E_R$ is equal to the peak amplitude of either the unit voltage or the component voltage induced in the central stator slot 5 multiplied by one-half the total number of stator slots in the two-collection assembly. In Figs. 1, 6, 9, 11, 14 to 16 and 21, this total number is 18, and one-half that number is 9.

When the total number of stator slots in a two-collection assembly is even, the two collections are necessarily duplicates and equal contributions are therefore afforded from both collections of conductor groups thereof. The resultant or composite voltage induced in a distributed phase winding comprising only a single collection of conductor groups as illustrated in Figs. 5 and 8, may therefore be expressed by the equation $$E_R = \frac{n}{4} \sin x$$

or by the equation $$E_R = \frac{N}{2} \sin x$$

where N is the number of component voltages induced in the conductor groups of a single-collection-assembly synchronous machine.

It may be shown that the equation thus derived for the composite sinusoidal voltage $E_R$ induced in the phase 1 distributed phase winding of Figs. 1, 5, 6, 8, 9, 11, 14 to 16, and 21, is applicable also to arrangements wherein no stator slots are alined with the reference center lines ₵ or reference zero lines Z. L. and to sinusoidally distributed phase windings which are in different orientation with respect to the stator slots.

Though the demonstration has proceeded on the assumption that a purely sinusoidal voltage is induced in each stator slot, this assumption is not exactly realized in practice. Despite this fact, however, if the numbers of conductors of each distributed phase winding varies as the sine, and the direction of winding changes alternately with, and with the negative of, the sign thereof, the resultant composite voltage will still be very nearly sinusoidal. This arises from the fact that most of the harmonics present in the component voltages are suppressed in the sinusoidally distributed phase windings and therefore do not appear in the composite output voltages. Just what harmonics are suppressed, depends upon the number of component voltages, magnetic circuits or stator slots.

It will be demonstrated, by summing separately the respective harmonics of the non-sinusoidal component voltages, that most of the harmonics of these non-sinusoidal component voltages cancel in the sinusoidally distributed phase winding and that, for this reason, the composite voltage curve is substantially sinusoidal. This will be done analytically for the general case of a synchronous machine of the present invention provided with a two-collection assembly of $n$ stator slots.

The curves $E_1$ to $E_9$ of Fig. 18, previously described as representing the component voltages respectively induced in the conductor groups of the phase 1 distributed phase winding disposed in the stator slots 1 to 9, when these component voltages are assumed sinusoidal, may now therefore be regarded as representing also the fundamental voltages of the component voltages when the component voltages are assumed non-sinusoidal.

Because the non-sinusoidal component voltages induced in the stator slots are of the same wave form, they are all known to contain fundamental and harmonic voltages respectively of the same frequency and in exactly the same ratio. It is therefore possible to represent any harmonic voltage of any amplitude H, of any harmonic order $h$, in any desired phase relation $\beta$, induced in the conductor group of the phase 1 distributed phase winding disposed in the $m$th stator slot by the equation $$y = H \cos\left(\theta + \frac{2\pi}{n}m\right) \sin h \cdot \left(x - \theta - \beta - \frac{2\pi}{n}m\right)$$

This equation introduces an angle $\theta$ to represent the general case in which the stator slots are displaced by that angle from the position shown in the drawings. In that position, of course, $\theta = 0$.

The sum of the harmonic voltages of the harmonic order $h$ induced in the conductor groups of the phase 1 distributed phase winding comprising two collections of conductor groups accordingly becomes represented by the equation $$Y = H \Sigma \cos\left(\theta + \frac{2\pi}{n}m\right) \sin h \cdot \left(x - \theta - \beta - \frac{2\pi}{n}m\right)$$

It may be shown that this equation equals zero, except when $h \pm 1$ is any whole number $k$ multiplied by $n$, the number of stator slots in the two-collection assembly of stator slots, or $$h = kn \pm 1$$

In either of these two latter cases, the equation reduces to $$Y = \frac{n}{2}H \sin[h \cdot (x - \theta - \beta) \pm \theta] \quad (5)$$

All other harmonics of the non-sinusoidal component voltages cancel in the sinusoidally distributed phase winding.

In the synchronous machine of the present invention shown in Fig. 22, for example, wherein the number of stator slots $n$ is twelve, the harmonics $h$ which do not cancel in the distributed phase 1 winding are $$h = 12k \pm 1$$

or the 11th, 13th, 23rd, 25th, 35th, and so on. In the synchronous machine shown in Figs. 1, 6, 9, 11, 14 to 16 and 21, on the other hand, wherein the number $n$ of stator slots is eighteen, only the 17th, 19th, 35th, 37th, and similarly spaced other higher harmonics remain uncancelled. The synchronous machine shown in Figs. 5 and 8, as previously explained, performs in exactly the same manner as each of the two like collections of the two-collection assembly of Figs. 1, 6, 9, 11, 14 to 16 and 21, and the same harmonics will be cancelled. Similar considerations apply to the cancellation of the harmonics in the sinusoidally distributed phase 2 and phase 3 windings.

A very pure composite sinusoid is therefore obtainable, even when the alternating component voltages are not truly sinusoidal. Whatever deviation from the theoretical sine wave appears, in actual practice, at the output terminals of the synchronous machine of the present invention, is confined to the higher harmonics, and to only a very few of those. Even these higher harmonics, if desired, can be greatly reduced by skewing the stator laminations or the pole faces, or by other conventional methods, applied to the elimination of these higher harmonics only.

The above Equation 5 demonstrates that the harmonics of the composite voltage induced in a sinusoidally distributed phase winding are of the same relative peak amplitude irrespective of the orientation of the distributed phase winding and irrespective of the phases of the harmonics in the component voltage wave form. The phases of the various harmonics of the composite voltage, however, are dependent upon the phases of the respective harmonics of the component voltages and upon the orientation of the sinusoidally distributed phase winding. In sinusoidally distributed phase windings which are not alike, such as the phase 1 and phase 2 distributed phase windings of Fig. 21, the harmonics of the composite voltages induced in the respective distributed phase windings are not in the same phase relation with respect to their respective fundamental voltages. This, however, is of minor importance, for the harmonics are of so low amplitude that, in a practical machine, they may be disregarded.

It is now in order to consider the operation of the synchronous machine of the present invention under load conditions. The analysis above, based merely upon the alternating magnetomotive forces produced in the magnetic circuits of the armature magnetic system by the field-magnet poles must be supplemented by the additional alternating magnetization effected in these magnetic circuits by the alternating currents in the conductor groups connected into the various phase-winding circuits.

The currents of the distributed phase windings of the polyphase winding each supplies a component magnetomotive force of the corresponding phase to each stator slot that is proportional to the number of conductors of the conductor group of that distributed phase winding disposed in that particular stator slot. The maximum magnetomotive force is accordingly contributed to the stator slot provided with a conductor group of that distributed phase winding comprising the maximum or unit number of conductors. This maximum magnetomotive force may be referred to as a unit magnetomotive force and its relative peak amplitude may be assumed equal to unity or 1.000, numerically the same as the number of conductors of the conductor group. The relative peak amplitude of the magnetomotive force contributed to any other stator slot by the current of this same phase is then similarly numerically the same as the number of conductors of the conductor group of this distributed phase winding disposed in that stator slot.

Referring to Fig. 20, with suitable choice of the origin of coordinates, the unit magnetomotive force contributed to any stator slot by the current of phase 1 in an assumed unit conductor group of that phase disposed in that stator slot may be represented, disregarding the alternately opposite polarity, by the equation $$y = \sin x$$

The corresponding equation for the unit magnetomotive force contributed to any stator slot by the current of the $q$th phase in an assumed unit conductor group of

chronous machines wherein each collection of stator slots is provided with an odd number of stator slots and each collection of rotor poles is provided with an even number of rotor poles, one less or one more in number than the number of stator slots in each collection of stator slots. In such synchronous machines, the collections of stator slots, the magnetic circuits which respectively encircle those stator slots, and the conductor groups disposed therein are respectively duplicates. Furthermore, in the conductor groups of each phase winding disposed in the stator slots of each collection of stator slots, there are as many conductors wound in the positive direction as there are conductors wound in the negative direction.

The invention is obviously not restricted to use with nine or any other odd number of stator slots or magnetic circuits in each collection of stator slots or magnetic circuits, or to eight or any other even number of rotor poles in each collection of rotor poles. Nor is it restricted to distributed phase windings the conductor groups of which, disposed in each collection of stator slots, are provided with the same number of conductors wound in each direction. In emphasis of this fact, reference may now be had to Fig. 22, which is a counterpart, in all respects, of Fig. 6, except that the two collections of eight poles each of Fig. 6 have been replaced by two collections of five poles, and the two collections of nine stator magnetic circuits and slots of Fig. 6 have been replaced by two collections of six magnetic circuits and slots each. The stator collections, of course, may embody one less magnetic circuit or slot each, instead of one more, than the number of poles in each collection of poles.

The ten alternately positive and negative poles of the two collections of rotor poles on the rotor 183 are shown in Fig. 22 at 126 to 135, and the rotor slots, one between each two adjacently disposed rotor poles, are shown at 136 to 145. The twelve stator slots on the stator 182 are shown at 146 to 157, and the twelve stator teeth, one between each two adjacently disposed stator slots, at 158 to 169. When the rotor slot 138, for example, and the stator slot 149, for example, are alined along the center line of the stator teeth and stator slots of one collection, the rotor slot 143 and the stator slot 155 will be alined diametrically opposite thereto, along the center line of the stator teeth and stator slots of the other collection.

When each collection of rotor poles is thus provided with an odd number of rotor poles, illustrated as five in Fig. 22, diametrically oppositely disposed rotor poles are necessarily of opposite polarity. Furthermore, diametrically oppositely disposed stator magnetic circuits become excited in opposite polarity, rather than in the same polarity, and the negative collection of magnetic circuits is actually a negative collection. This difference in the positive and negative collections of stator magnetic circuits, when the number of stator magnetic circuits in each collection of stator magnetic circuits is even, is compensated for in the sinusoidally distributed winding, as will be explained presently, so that the component voltages induced in diametrically oppositely disposed stator slots are duplicates, just as they are in the arrangements previously described. However, due to the odd number of poles in each collection of poles, the assembly must necessarily include an even number of collections.

The twelve stator teeth and stator slots of the two collections are shown equiangularly spaced throughout the circumference, starting with the stator slot 146 disposed along the positive reference zero line +Z.L. The geometric-sequence or slot angles, and the corresponding phase-sequence angles, of the stator slots 146 to 157 are therefore respectively equal to 0, 30, 60, 90, 120, 150, 180, 210, 240, 270, 300 and 330 degrees, and the absolute or positive numerical values of the sines of these angles are respectively equal to 0.000, 0.500, 0.866, 1.000, 0.866, 0.500, 0.000, 0.500, 0.866, 1.000, 0.866 and 0.500.

According to the arrangement illustrated in Fig. 22, this distribution of the conductors of the conductor groups is attained, for example, by disposing a coil or winding having the relative number 0.500 of turns in the stator slots 147 and 148 and the stator slots 156 and 157, so as respectively to enclose the stator teeth 159 and 168; disposing a 0.366 coil or winding in the stator slots 148 and 149 and also in the stator slots 155 and 156, so as respectively to enclose the stator teeth 160 and 167; disposing a 0.634 coil or winding in the stator slots 149 and 150, as well as in the stator slots 154 and 155, so as respectively to enclose the stator teeth 161 and 166; and disposing a 0.232 coil or winding in the stator slots 150 and 151, and also in the stator slots 153 and 154, so as respectively to enclose the stator teeth 162 and 165. The stator slots 146 and 152, as already explained, require zero conductors or windings, but an additional 0.268 winding is shown disposed in the stator slots 151 and 153 in order to provide the excess of conductors wound in the positive direction in the positive collection of stator slots 146 to 151 and the excess of conductors wound in the negative direction in the negative collection of stator slots 152 to 157.

The relative number of conductors in the conductor groups of the central stator slots 149 and 155 will therefore be 0.366+0.634 or 1.000. The relative number of conductors in the conductor groups of the stator slots 148 and 156 will be 0.500+0.366 or 0.866. The same 0.866 value is obtained for the conductor groups of the stator slots 150 and 154, by adding 0.634 and 0.232. As the conductor groups in the stator slots 147 and 157 are constituted of only the 0.500 windings, the relative number of turns per coil or winding and the relative number of conductors per slot, in this instance, are the same. The relative number of conductors in the stator slots 151 and 153 are similarly 0.500, but provided by the 0.232 and 0.268 coils or windings.

As in the cases already considered, the direction of winding of the conductors changes alternately with, and with the negative of, the sign of the sine of the geometric-sequence angles associated with the conductor groups, and the conductor groups are connected in series along these directions of winding. Still bearing in mind that the directions of the current are indicated by the arrows, the series circuit of Fig. 22 may be traced from a line terminal 170, by way of a line conductor 171, through the 0.500 winding disposed in the stator slots 147 and 148, by way of a conductor 172, through the 0.366 winding disposed in the stator slots 148 and 149, by way of a conductor 173, through the 0.634 winding disposed in the stator slots 149 and 150, by way of a conductor 174, through the 0.232 winding disposed in the stator slots 150 and 151, and, by way of a conductor 175, to the 0.268 winding disposed in the stator slots 151 and 153. The series circuit continues through this 0.268 winding and, by way of the conductors 176, 177, 178 and 179, through the remaining 0.232, 0.634, 0.366 and 0.500 coils or windings, to a line conductor 180 connected to a line terminal 181.

The change in the direction of winding due to the change in the sign of the sine function is somewhat obscured in this distributed winding of Fig. 22. The obscurity arises out of the fact that, because the sine of the angles zero and π or 180 degrees, associated with the conductor groups disposed in the stator slots 146 and 152, is equal to 0.000, there are no conductors disposed in these stator slots. Since, therefore, there are no conductors in the conductor groups disposed in these slots 146 and 152, no direction of winding can be associated with these zero conductor groups. The obscurity will become resolved, however, if it be observed that, still retaining the alternateness in the direction of winding from stator slot to stator slot, a change will be introduced in the direction of winding at these points by winding in opposite directions the conductor groups disposed on opposite sides of the reference zero line Z.L.

In Fig. 22, the direction of winding is opposite in diametrically oppositely disposed stator slots, rather than the same, as in Figs. 1, 9, 14 to 16 and 21. However, the polarity of the magnetic circuits encircling diametrically oppositely disposed stator slots is also opposite. The distributed phase winding of Fig. 22, therefore, performs in exactly the same manner as the phase 1 distributed phase winding of these Figs. 1, 6, 9, 14 to 16 and 21.

The distributed phase winding of Fig. 22 would constitute one of the distributed phase windings of a polyphase arrangement. A three-phase polyphase winding would be provided with two additional distributed phase windings comprising conductor groups identical to those of Fig. 22, but respectively displaced $2\pi/3$ or 120 and $4\pi/3$ or 240 degrees counterclockwise, in the direction of the phase sequence. A two-phase arangement would be provided similarly with only one additional distributed phase winding, displaced $\pi/2$ or 90 degrees counterclockwise. In both the two-phase and the three-phase arrangements, the distributed phase windings would be alike, for the number 12 of stator slots is divisible by both three and four.

The phase winding illustrated in Fig. 22 may be simplified by selecting an orientation of the reference lines such that the stator slots of each collection of stator slots symmetrically straddle the reference center line ₵. The unequal number of conductors wound in each direction through the stator slots of each collection of stator slots is then avoided because, for each conductor group associated with one direction of winding, there is a conductor group disposed symmetrically thereto, on the other side of the reference center line, that has the same number of conductors wound in the opposite direction.

The invention is not restricted to use with only single assemblies of stator slots, nor to assemblies of stator slots equiangularly spaced throughout only $2\pi$ or 360 degrees. In Fig. 23, for example, the stator 19 is shown provided with two assemblies of stator slots: first, the previously described single-collection assembly of nine stator slots 1 to 9; and, secondly, the stator slots of an additional single-collection assembly of nine stator slots 1(2) to 9(2). These two assemblies function in exactly the same manner. Each stator slot of each of these two single-collection assemblies of stator slots lies midway between two stator slots of the other assembly of stator slots. For reasons which will presently appear, the stator slots 1(2) to 9(2) of Fig. 23 are disposed diametrically opposite to the stator slots 1 to 9, respectively.

The single-collection assembly of stator slots 1 to 9 is provided with the same positive reference zero line +Z.L. and the same positive reference center line + ₵ in Fig. 23 as in Fig. 5. The positive reference zero line +Z.L. is shown radially disposed midway between the stator slots 1 and 9 and the positive reference center line + ₵ is shown radially alined with the central stator slot 5. For each of these reference lines, as previously explained, there is a corresponding reference phase.

The single-collection assembly of stator slots 1(2) to 9(2) of Fig. 23 is similarly provided with a positive reference zero line +Z.L.(2) radially disposed midway between the stator slots 1(2) and 9(2) and with a positive reference line + ₵ (2) radially alined with the central stator slot 5(2). For each of these reference lines also, as will be explained, there is a corresponding reference phase.

The rotor 20 of Fig. 23, unlike the rotor 20 of Fig. 5, is provided with an additional winding 185 which functions as a starting-and-damping winding when the synchronous machine illustrated therein is used as a synchronous motor. Furthermore, each rotor slot and each rotor pole is identified by two numbers separated by a dash. The first of these numbers is the same as the corresponding number of Fig. 5. The purpose of the second number will be explained presently. However, disregarding for the moment the presence of the additional winding 185 and the second identifying number associated with each rotor slot and each rotor pole, the rotor 20 of Fig. 23 may be said to function in exactly the same manner as the rotor 20 of Fig. 5.

Each of the stator slots of the additional single-collection assembly of stator slots 1(2) to 9(2) like each of the stator slots of the single-collection assembly of stator slots 1 to 9, is encircled by a magnetic circuit and each magnetic circuit is energized by the rotating field magnet in the same manner as previously described in connection with Figs. 5 and 8. A single-unit core must necessarily be used to provide continuity for all the magnetic circuits of both assemblies of magnetic circuits.

The phase relations of the alternating magnetic fluxes of the magnetic circuits encircling the stator slots of the single-collection assembly of stator slots 1 to 9 have already been described. The phase relations of the alternating magnetic fluxes of the magnetic circuits encircling the stator slots of the additional assembly of stator slots 1(2) to 9(2) may be readily determined by comparison. For example, the stator slot 5 of the single-collection assembly of stator slots 1 to 9 and the stator slot 5(2) of the single-collection assembly of stator slots 1(2) to 9(2) are both shown in Fig. 23 alined with a rotor slot. Furthermore, a rotor north pole N is disposed counterclockwise, and a rotor south pole S clockwise, with respect to each of these stator slots 5 and 5(2). The magnetic flux of the magnetic circuit encircling the stator slot 5(2) is therefore of exactly the same phase and polarity as the magnetic flux of the magnetic circuit encircling the stator slot 5.

The alternating magnetic fluxes encircling the stator slots 1(2) to 9(2), like the alternating magnetic fluxes encircling the stator slots 1 to 9, are of alternately opposite polarity. Disregarding the alternately opposite polarity, they are equally phase-displaced over a total range of $\pi/2$ or 90 magnetic degrees, for the stator slots of both the single-collection assembly of stator slots 1(2) to 9(2) and the single-collection assembly of stator slots 1 to 9 are equally spaced throughout the circumference. It follows, therefore, that, if the magnetic fluxes of the magnetic circuits encircling the stator slots 5(2) and 5 are of the same phase and polarity, the magnetic fluxes of the magnetic circuits encircling all the stator slots 1(2) to 9(2) are respectively of the same phase and polarity as the magnetic fluxes of the magnetic circuits encircling the stator slots 1 to 9. As a matter of fact, the stator slots of the additional single-collection assembly of stator slots 1(2) to 9(2) were intentionally numbered with the same numbers as those of the single-collection assembly of stator slots 1 to 9, but each followed by (2), so that corresponding stator slots of the two single-collection assemblies of stator slots 1 to 9 and 1(2) to 9(2), associated with the same phase, could be readily identified. Furthermore, if the corresponding stator slots of the two single-collection assemblies of stator slots 1 to 9 and 1(2) to 9(2) are associated with the same phase, the same is true of their corresponding reference zero lines +Z.L. and +Z.L.(2) and reference center lines + ₵ and + ₵ (2), respectively.

It is to be noted, therefore, that the positive reference center line + ₵ and the positive reference zero line +Z.L.(2) are reference lines of two different assemblies of stator slots and, although they coincide and are therefore represented by the same radial line, they are nevertheless associated with a phase difference of $\pi/2$ or 90 degrees. The same is true also of the positive reference zero line +Z.L. and the positive reference center line + ₵ (2).

When the stator 19 is provided with two assemblies of stator slots, the stator slots of each assembly of stator slots are separated by a stator slot of the other assembly of stator slots and two stator teeth. In Fig. 23, for example, the stator slots 5 and 6 of the single-collection assembly of stator slots 1 to 9 are separated by the stator slot 1(2) of the single-collection assembly of stator slots 1(2) to 9(2) and the two stator teeth 46—41 and 46—42. However, considering the two assemblies as separate entities, the two stator teeth between each two stator slots of an assembly of stator slots perform the same function as would a single stator tooth similarly disposed. The stator teeth 46—41 and 46—42 of Fig. 23 perform exactly the same function with respect to the stator slots of the single-collection assembly of stator slots 1 to 9 as the stator tooth 46 of Figs. 5 and 8.

Furthermore, because the assembly of stator slots 1(2) to 9(2) of Fig. 23 is a duplicate of the assembly of stator slots 1 to 9, except that they are in a different orientation, there are two stator teeth which perform a similar function with respect to this additional assembly of stator slots 1(2) to 9(2) also. To maintain the functional reference, each stator tooth in Fig. 23 is identified by means of two numbers separated by a dash. The number before the dash is the number of the equivalent stator tooth with respect to the assembly of stator slots 1 to 9, and the number after the dash is the number of the equivalent stator tooth with respect to the assembly of stator slots 1(2) to 9(2), as determined by their similarity in function to the stator teeth shown in Figs. 5 and 8. For example, the stator teeth 46—41 and 46—42, in Fig. 23, bear the same relation to the assembly of stator slots 1 to 9 and the stator teeth 41—46 and 42—46 to the assembly of stator slots 1(2) to 9(2) as does the single stator tooth 46 to the assembly of stator slots 1 to 9 in Figs. 5 and 8.

Although the magnetic circuits encircling the stator slots of the single-collection assembly of stator slots 1(2) to 9(2) of Fig. 23 are thus energized in exactly the same manner or phase as the magnetic circuits encircling the stator slots of the single-collection assembly of stator slots 1 to 9, respectively, they are not, at any one instant, respectively energized by the same field-magnet poles. For example, at the instant illustrated by Fig. 23, the magnetic circuit encircling the stator slot 5 is energized by the rotor north and south poles 68—64 and 67—71, respectively, and the magnetic circuit encircling the stator slot 5(2) is energized in exactly the same manner, but by the rotor north and south poles 64—68 and 71—67, respectively. A particular rotor pole therefore does not function in exactly the same manner, or, more correctly, in the same phase, with respect to the respective stator slots of both the single-collection assemblies of stator slots 1 to 9 and 1(2) to 9(2).

Again to maintain the same functional reference with respect to both assemblies of stator slots 1 to 9 and 1(2) to 9(2), each rotor pole and each rotor slot is identified by two numbers separated by a dash. The first number indicates the relation of the rotor pole or slot with respect to the assembly of stator slots 1 to 9 and the second number, the relation of the rotor pole or slot with respect to the assembly of stator slots 1(2) to 9(2). Thus, in Fig. 23, the rotor pole 68—64 performs with respect to the assembly of stator slots 1 to 9, and the rotor pole 64—68 with respect to the assembly of stator slots 1(2) to 9(2), in the same manner as does the rotor pole 68 of Figs. 5 and 8 with respect to the assembly of stator slots 1 to 9. In Fig. 23, therefore, corresponding stator slots, corresponding stator teeth, corresponding rotor poles and corresponding rotor slots, as well as corresponding geometric reference lines of the respective single collections are displaced $\pi$ or 180 degrees.

The stator slots of each of the assemblies of stator slots 1 to 9 and 1(2) to 9(2) may be provided with phase windings similar to those of Figs. 3, 4 or 7 or they may be provided with distributed phase windings similar to those of Figs. 1, 5, 6, 8, 9, 11, 14 to 16 and 21. If distributed phase windings are used, they may be oriented to correspond with any desired output phase. If, however, the distributed phase windings associated with each assembly of stator slots are to be respectively connected to the same phases of the same electric system, the reference lines shown in Fig. 23 may constitute the reference lines for the phase 1 distributed phase windings, and additional reference lines may be selected for the other distributed phase windings, as previously explained. The conductor groups of such phase 1 distributed phase windings are shown disposed in the stator slots of the assemblies of stator slots 1 to 9 and 1(2) to 9(2). Additional conductor groups would be required for each of the other phase windings.

A further modification, somewhat similar to the modification described in connection with Fig. 23, is illustrated by Fig. 24. Disregarding the presence of the starting winding 185, Fig. 24 illustrates the same single-collection assembly of nine stator slots 1 to 9 as Fig. 5, but equiangularly spaced over a total geometric angle equal to $4\pi$ or 720 degrees, rather than $2\pi$ or 360 degrees. When the stator slots of the single-collection assembly of stator slots 1 to 9 are thus equiangularly spaced throughout $4\pi$ or 720 degrees, each pair of consecutively numbered stator slots becomes separated by two stator teeth and a further stator slot. The rotor poles and slots, on the other hand, become superposed, so that the number of rotor poles and rotor slots is reduced by a factor of two. The various parts of the single-collection assembly still function as they do in the synchronous machine illustrated by Fig. 5, although the synchronous speed is increased, due to the reduction in the number of rotor poles. The two stator teeth between each pair of consecutively numbered stator slots performs the same function as the corresponding stator tooth of Fig. 5. Furthermore, since each stator tooth of Fig. 24 is disposed between two pairs of different consecutively numbered stator slots, each stator tooth performs two functions. To maintain the functional reference in Fig. 24, as in Fig. 23, each stator tooth is identified by two numbers separated by a dash. Each rotor pole and each rotor slot is also identified in Fig. 24 by two numbers separated by a dash, for each rotor pole and each rotor slot performs the functions of the two rotor poles or slots which are indicated by the two respective numbers.

The synchronous machine illustrated in Fig. 23 is provided with two diametrically opposed like single-collection assemblies, and it is therefore magnetically balanced. The magnetic balance of the single-collection assembly of Fig. 24, on the other hand, although improved over that of the single-collection assembly of Fig. 5, is nevertheless not complete.

The synchronous machine illustrated by Fig. 24 is not limited to a single-collection assembly of only nine stator slots and a corresponding single-collection assembly of only nine stator magnetic circuits. Additional similar single-collection assemblies of stator slots and magnetic circuits may be provided, preferably equiangularly spaced with respect to the collection of stator slots and magnetic circuits shown; and, furthermore, each assembly of stator slots or magnetic circuits may comprise more than one collection. In a particular arrangement, of course, each assembly must comprise the same number of collections and the same number of stator slots or magnetic circuits, respectively, and each assembly of stator slots must be provided with a suitable polyphase winding, as previously described. Nor is the synchronous machine of the present invention limited to assemblies of stator slots and corresponding assemblies of magnetic circuits equiangularly spaced throughout only $2\pi$ or 360 or $4\pi$ or 720 degrees. They may be equiangularly spaced, in a similar manner, throughout any desired integral number of times $2\pi$ or 360 degrees. However, to avoid superposition of stator slots or magnetic circuits of each assembly of stator slots or magnetic circuits, and to provide the desired superposition of the rotor poles, the said integral number must not be a factor of the number of stator slots or magnetic circuits of each assembly of stator slots or magnetic circuits, respectively, and it must be a factor of the number of rotor poles.

Accordingly, when the stator slots of each assembly of stator slots, or the magnetic circuits of each assembly of magnetic circuits, are disposed at positions sequentially separated in the same angular direction by an angle substantially equal to $2\pi$ or 360 degrees multiplied by an integral number, not a factor of the number of stator slots or magnetic circuits of each assembly of stator slots or magnetic circuits, divided by the number of stator slots or magnetic circuits of each assembly of stator slots or magnetic circuits, respectively, the number of field-magnet poles of the assembly of field-magnet poles must be equal in number to a number which, multiplied by the said integral number, is equal to the number of stator slots of each assembly of stator slots, or the number of magnetic circuits of each assembly of magnetic circuits, plus or minus the number of collections of stator slots or magnetic circuits of each assembly of stator slots or magnetic circuits, respectively.

In the case of Fig. 24, for example, the integral number is 2, which is not a factor of nine, the number of stator slots in the single-collection assembly of stator slots. The stator slots of the assembly of stator slots are disposed at positions sequentially separated by an angle 80 degrees. This angle 80 degrees is $2\pi$ or 360 degrees multiplied by this factor 2, and divided by 9, the number of stator slots in the assembly of stator slots. The number of field-magnet poles of the assembly of field-magnet poles is 4, which, multiplied by the said integral number 2, is equal to the number 9 of stator slots of the assembly of stator slots 1 to 9, minus 1, the number of collections in the assembly of stator slots.

When the synchronous machine of the present invention is operated as a synchronous motor, the magnetization provided to each armature magnetic circuit, by the current through the stator slot which it encircles, leads, rather than lags, the magnetization provided by the field-magnet poles. However, the magnetic-flux contributions from these two sources still have the same phase displacement in each armature magnetic circuit, and the contributions from each of these two sources have the same peak amplitude and wave form in each of the armature magnetic circuits. The alternating magnetic fluxes induced in the armature magnetic circuits therefore remain equally phase-displaced and of the same wave form and peak amplitude.

In other respects also, the synchronous motor of the present invention operates in substantially the same manner as the corresponding synchronous generator; only the terminology is different. The alternating magnetic fluxes induce component back electromotive forces in the conductor groups of the various sinusoidally distributed phase windings proportional to the numbers of conductors of the respective conductor groups. The component back electromotive forces combine in the respective distributed phase windings into substantially sinusoidal composite back electromotive forces which oppose the respective sinusoidal impressed voltages; and balanced substantially sinusoidal currents flow through the various distributed phase windings.

The synchronous motor must, of course, be brought up to speed, whereupon it will "lock in" in a manner characteristic of all synchronous motors.

For induction starting, the synchronous motor of the present invention may be provided with a plurality of starting windings similar to the field-magnet winding. As in present-day synchronous motors, the field-magnet winding itself may be employed as one of the required plurality of starting windings, simply by connecting the end conductors thereof to complete the circuit.

In Figs. 25 and 26, the rotor 262 is shown provided, in addition to a field-magnet winding 270, disposed in the rotor slots of the two-collection assembly of rotor slots 21 to 36, with a starting winding 269, disposed in the rotor slots of an additional two collection assembly of rotor slots 321 to 336. The rotor slots of the assembly of rotor slots 321 to 336 are equally spaced with respect to the rotor slots of the assembly of rotor slots 21 to 36.

The field-magnet winding 270 may be wound according to any one of many well-known methods. In Figs. 25 and 26, it is shown constituted of eight series-connected coils 641 to 648, each disposed in two rotor slots. The eight coils 641 to 648 are not shown completely in Fig. 25, but the rotor shaft has been broken away, in Fig. 26, in order to clarify their showing and their disposition in the rotor slots 21 to 36. With the same end in view, they are shown schematically only. In both Figs. 25 and 26, the rotor 262 is shown rotated with respect to the positions shown in Figs. 1 to 8, in order the better to illustrate the disposition of the eight coils 641 to 648.

These eight coils 641 to 648 are grouped into four pairs: the pair of coils 641 and 642, the pair 643 and 644, the pair 645 and 646 and the pair 647 and 648. The coils of each pair of coils are disposed symmetrically on opposite sides of a line connecting two diametrically oppositely disposed rotor slots of the additional two-collection assembly of rotor slots 321 to 336. These four lines of symmetry 637, 638, 639 and 640 are shown equiangularly spaced, at 45 degree intervals.

The circuit of the field-magnet winding 270 of Figs. 25 and 26 is shown extending from an end conductor 414 through the coil 641 disposed in the rotor slots 21 and 30 on one side of the line of symmetry 637, by way of a conductor 415, through the coil 642 disposed in the rotor slots 22 and 29 on the other side of the line of symmetry 637. From the coil 642, the circuit of the field-magnet winding 270 continues, by way of the conductor 416, through the coil 643 disposed in the rotor slots 23 and 32 on one side of the line of symmetry 638, by way of a conductor 417, through the coil 644 disposed in the rotor slots 24 and 31 on the other side of the line of symmetry 638, by way of a conductor 418, through the coil 645 disposed in the rotor slots 25 and 34 on one side of the line of symmetry 639, and by way of a conductor 419, through the coil 646 disposed in the rotor slots 26 and 33 on the other side of the line of symmetry 639. From the coil 646, finally, the circuit of the field-magnet winding 270 continues, by way of the conductor 420, through the coil 647 disposed in the rotor slots 27 and 36 on the one side of the line of symmetry 640, and, by way of a conductor 421, through the coil 648 disposed in the rotor slots 28 and 35 on the other side of the line of symmetry 640, to a further end conductor 422.

The complete field-magnet winding 270, disposed in the rotor slots of the two-collection assembly of rotor slots 21 to 36, provides the same number of conductors to each of the rotor slots 21 to 36, and the direction of winding of these conductors is alternately opposite from rotor slot to rotor slot of this two-collection assembly of rotor slots 21 to 36. More precisely, starting with the conductor 414, the direction of winding through the rotor slot 21, as also through all the other odd-numbered rotor slots, is in a direction away from the reader and, through all the even-numbered rotor slots, in a direction toward the reader. There is no change in this alternately opposite direction of winding between collections such as has been described in connection with the sinusoidally distributed stator windings.

In Figs. 25 and 26, the end conductors 414 and 422 of the field-magnet winding 270 are shown respectively connected to a terminal 413 and a slip ring 424 of a centrifugal switch 89. A switch arm 409, provided with a contact member 408, is connected to the terminal 413 by means of a flexible conductor 440. The contact member 408 engages a further contact member 425, provided on a projection 423 of the slip ring 424, when the switch arm 409, pivoted at 411, is pulled by the spring 412. The field-magnet winding 270 is thereby short-circuited upon itself and functions as a starting winding.

The additional endless starting winding 269 of Figs.

25 and 26 comprises a single endless insulated conductor wound in alternately opposite directions through the rotor slots of the two-collection assembly of rotor slots 321 to 336. This endless starting winding 269, like the field-magnet winding 270, provides the same number of conductors to each of the rotor slots in which it is disposed.

At the instant of starting, before the rotor 262 begins to rotate, the alternating magnetic fluxes produced in the stator magnetic circuits by the polyphase current, heretofore described as the first set of magnetic fluxes, induce a resultant line-frequency voltage in each of the rotor windings 269 and 270. Because the rotor windings 269 and 270 are angularly displaced upon the rotor 262 an amount equal to one-half the angular distance between two adjacent field-magnet poles, the resultant voltages induced in these windings 269 and 270, and the currents produced thereby, are displaced $\pi/2$ or 90 electric degrees in phase.

Field-magnet-type windings, thus geometrically displaced and thus excited, are known to produce a rotating magnetic field. The particular rotating magnetic field, thus produced in the rotor 262, comprises sixteen alternately opposite poles, the same as the number of poles of the field magnet. The rotating magnetic field, according to the present invention, therefore, is produced by the above-mentioned first set of alternating magnetic fluxes. This rotating magnetic field cooperates with the stator rotating magnetic pattern to produce torque in the rotor element.

The rotor 262 accordingly accelerates from its starting position, and the resultant voltages induced in the rotor windings 269 and 270, like the resultant voltages induced in the phase windings of present-day wound rotor motors, decrease in both amplitude and frequency.

In Figs. 25 and 26, the slip ring 424 and a further slip ring 406 are shown mounted upon an insulated switch body 426. Two brushes 405 and 427, respectively engaging the slip rings 406 and 424, are shown respectively connected by the conductors 404 and 428 to the line terminals 403 and 429 of the direct current supply. A contact member 407 is shown carried by the slip ring 406.

When the rotor approaches synchronous speed, owing to its weight, supplemented by an additional weight 410 attached thereto, the switch arm 409 is thrown outward, by centrifugal force, against the action of the spring 412, to actuate the switch-arm contact member 408 out of engagement with the contact member 425, and into engagement with the contact member 407, thereby connecting the field-magnet winding 270 to the source of direct current. The rotor then "locks in" and the machine functions as a synchronous motor. The starting winding, at this time functions to damp out any oscillations with respect to synchronism.

The direct-current circuit for supplying the rotor winding 270 may be traced from the line terminal 403 of the direct-current supply, by way of the conductor 404, to the brush 405; from the slip ring 406, in contact therewith, through the contact members 407 and 408, to the switch arm 409; and, from this arm 409, through the flexible lead 440, to the terminal 413 of the rotor winding 270. The circuit continues, by way of the conductor 414, through the various coils 641 to 648 of the rotor winding 270 and conductors 415 to 421. The conductor 422 completes the circuit to the projection 423 integral with the slip ring 424. From the slip ring 424, the circuit continues through the brush 427, by way of the conductor 428, to the other line terminal 429 of the direct-current supply.

When the rotor 262 slows down, of course, the switch arm 409 is pulled back by the spring 412 to its normal position, in which the contact member 408 engages the contact member 425, in order that the motor may again function as an induction motor.

From the above description, it would appear that the induction starting windings 269 and 270 perform in exactly the same manner as do present-day induction windings. This appearance is only because the above description has intentionally been confined to the points of similarity. With regard to the voltages induced in the individual rotor slots, the windings 269 and 270 are very different from present-day induction windings. In the induction-starting winding of the synchronous motor of the present-invention, the voltages induced in the individual rotor slots increase, rather than decrease, in frequency, as the rotor speed increases. It is only because the voltages induced in the individual rotor slots are modulated that, in the complete rotor phase-winding circuit, they produce a resultant voltage that decreases in frequency and amplitude as the rotor speed increases. At synchronous speed, the voltages induced in the individual rotor slots of one assembly of rotor slots become equally phase-displaced over a total range of phase displacement of a multiple of $2\pi$ or 360 degrees. At synchronous speed, there is no modulation of these voltages, and their amplitude is substantially the same, so that, due to their equal phase displacement, their resultant is equal to zero.

Of interest herein is the fact that even at synchronous speed, voltages are induced in the individual rotor slots. For this reason, if the synchronous motor of the present invention is provided with only one assembly of stator slots, equiangularly spaced over $2\pi$ or 360 degrees, and with starting windings similar to the starting winding 269 of Figs. 25 and 26, such starting windings must be insulated and the rotor core must be laminated for efficient synchronous operation.

At synchronous speed, as stated above, the voltages induced in the conductors of the phase winding 269 of Figs. 25 and 26 add in the rotor phase winding to produce a zero resultant voltage. Stated differently, the voltage induced in a conductor disposed in a particular rotor slot of a two-collection assembly of rotor slots is cancelled by an equal and opposite voltage induced in a conductor disposed in a rotor slot displaced $\pi/2$ or 90 degrees therefrom. For example, at synchronous speed, the voltage induced in the conductor of the rotor phase winding 269 disposed in the rotor slot 321 is cancelled by the voltage induced in the conductor of the same rotor phase winding 269 disposed in the rotor slot 325. It becomes obvious, therefore, that, by providing two assemblies of stator slots, and corresponding two assemblies of stator magnetic circuits, suitably displaced geometrically and electrically, as shown in Fig. 23, a similar cancellation can be effected in each conductor, rather than in two conductors displaced $\pi/2$ or 90 degrees, and the starting or damping winding then does not require insulation. Similar considerations apply when the stator slots and magnetic circuits are equiangularly spaced throughout an integral number of times $2\pi$ or 360 degrees, as illustrated in Fig. 24.

Therefore, if a winding similar to the winding 269 of Figs. 25 and 26 were used in conjunction with the rotor 20 of Fig. 23, it would not require insulation. At synchronous speed, no voltages would be induced in the winding and, at intermediate speeds, it would function in the same manner as described in connection with Figs. 25 and 26.

Actually, the rotor 20 of Fig. 23 is provided with three additional single-collection assemblies of rotor slots and each rotor slot thereof is provided with a single uninsulated conductor. These conductors are shown integrated into a single squirrel-cage winding 185 which is the equivalent of three separate induction starting or phase windings. At the instant of starting, and at intermediate speeds, the currents through the bars of the squirrel-cage winding produce torque in the rotor element and, at synchronous speed, the squirrel-cage winding 185 functions to damp out oscillations with respect to synchronous speed.

The rotor 20 of Fig. 24 is also provided with a squirrel-cage winding 185 and this winding functions in the same manner as the squirrel-cage winding 185 of Fig. 23. The squirrel-cage winding 185 of Fig. 24, however, comprises five, rather than three, induction starting windings incorporated into the single squirrel-cage winding 185.

The synchronous machine of the present invention has all the advantages associated with other polyphase machines of a large number of poles. When designed for a frequency of 60 cycles, it is a low-speed machine and it may be connected directly to a low-speed prime mover or load. When designed for a higher frequency, it provides a high power output per pound of weight, an important consideration in aircraft and portable installations. In addition to these advantages, characteristic of all many-poled synchronous machines, the synchronous machine of the present invention offers improvements and advantages not obtainable with present-day synchronous machines.

In present-day synchronous machines, for example, it is necessary to provide the armature with a relatively large number of armature slots corresponding to each field-magnet pole, whereas, in the synchronous machine of the present invention, the number of armature slots may approximate to the number of field-magnet poles. With the decrease in the number of armature slots, the cost of the laminations is lower, less slot insulation is required and there are fewer coils to wind, all of which decrease the cost of the machine. The field of application is broader, for the invention makes it possible to build synchronous motors for higher frequency-to-speed ratios. This is because the mechanical design is not restricted by the presence of a large number of armature slots.

The invention is applicable to frequencies well above sixty cycles, particularly in the smaller sizes of machines, and to any desired voltage. The design, of course, should be appropriate to the voltage and frequency desired. However, for any particular design, there are fewer armature slots, less skewing of the laminations and less shaping of the pole pieces necessary and a substantially sinusoidal output will still result through the action of the sinusoidally distributed and overlapped polyphase windings.

It has been explained, in connection with Fig. 2, that the armature core may be built in sections, each section providing a circuit for the magnetic flux encircling one armature slot. Each lamination may therefore be small and there is no need for careful overlapping and butting of laminations to provide continuity, as in present-day synchronous machines. Large synchronous machines of this nature may be built in sections and the assembly may be completed at the point of installation. This is particularly true if simple armature phase windings, similar to the phase windings 1d to 18d of Figs. 3 and 4, are used.

The sinusoidally distributed polyphase winding, as has been described in detail, provides the desired sinusoidal operation under all conditions of balanced load. Of even greater importance, with regard to large machines, is the recognition of the fact that this sinusoidally distributed polyphase winding provides a means for transforming from a polyphase magnetic system of a large number of phases to a substantially sinusoidal polyphase electric system of a lesser number of phases and the further fact that this transformation need not be accomplished in the synchronous rotating machine where distributed windings are difficult to insulate. By eliminating the distributed windings, the synchronous machine may be greatly simplified and the power output increased by a large factor. This is particularly true in large installations.

Further modifications will occur to persons skilled in the art, and all such are intended to be included within the spirit and scope of the invention, as defined in the appended claims.

What is claimed is:

1. A synchronous machine having, in combination, stator and rotor elements, one of the elements having means for producing a magnetic system, stationary with respect to the said one element, of substantially equiangularly spaced magnetic fluxes of alternately opposite polarity substantially equally phase-displaced, disregarding the alternately opposite polarity, over a total range substantially equal to a multiple greater than 2 of 180 degrees, and the other element having means for producing a magnetic field, stationary with respect to the said other element, of substantially equiangularly spaced poles of alternately opposite polarity equal in number to the number of magnetic fluxes plus or minus the said multiple.

2. A synchronous machine having, in combination, stator and rotor elements, one of the elements having means for producing a plurality of substantially like magnetic systems, stationary with respect to the said one element, each of the same number of substantially equiangularly spaced magnetic fluxes of alternately opposite polarity substantially equally phase-displaced, disregarding the alternately opposite polarity, over a total range substantially equal to the same multiple of 180 degrees, and the other element having means for producing a magnetic field, stationary with respect to the said other element, of substantially equiangularly spaced poles of alternately opposite polarity equal in number to the number of magnetic fluxes of each system of magnetic fluxes plus or minus the said multiple.

3. A synchronous machine having, in combination, stator and rotor elements, one of the elements having means for producing a plurality of substantially like magnetic systems, stationary with respect to the said one element, each of the same number of magnetic fluxes of alternately opposite polarity at positions sequentially separated in the same angular direction by an angle substantially equal to 360 degrees multiplied by an integral number greater than unity, not a factor of the number of magnetic fluxes of each system of magnetic fluxes, divided by the number of magnetic fluxes of each system of magnetic fluxes, the magnetic fluxes of each system of magnetic fluxes being substantially equally phase-displaced, disregarding the alternately opposite polarity, over respective total ranges each substantially equal to the same multiple of 180 degrees, and the other element having means for producing a magnetic field, stationary with respect to the said other element, of substantially equiangularly spaced poles of alternately opposite polarity equal in number to a number which, multiplied by the said integral number, is equal to the number of magnetic fluxes of each system of magnetic fluxes plus or minus the said multiple.

4. A synchronous machine having, in combination, stator and rotor elements, one of the elements having means for producing a magnetic system, stationary with respect to the said one element, of an assembly of substantially equiangularly spaced magnetic circuits comprising one or more collections each of substantially the same number of magnetic circuits, means for supplying a component magnetomotive force from and corresponding to each phase of a polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another respective angular amounts substantially equal to the phase displacement of the phases of the polyphase electric system, means for changing the polarities of the component magnetomotive forces and the component voltages corresponding to each phase of the polyphase electric system alternately with, and with the negative of, the sign of the said sine and for combining the said component voltages, in the said polarities, into composite voltages, one corresponding to each phase of the polyphase electric system, and the other element having means for producing a magnetic field, stationary with respect to the said other element, of substantially equiangularly spaced poles of alternately opposite polarity equal in number to the number of magnetic circuits plus or minus the number of collections of magnetic circuits.

5. A synchronous machine having, in combination, stator and rotor elements, one of the elements having means for producing a magnetic system, stationary with respect to the said one element, comprising one or more substantially like assemblies, each of the same number, of substantially equiangularly spaced magnetic circuits, each assembly comprising the same number of one or more collections each of substantially the same number of magnetic circuits, means for supplying a component magnetomotive force from and corresponding to each phase of a polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits of each assembly of magnetic circuits at angular increments each substantially equal to the said total range divided by the number of magnetic circuits of each assembly of magnetic circuits, the respective total ranges of the respective assemblies of magnetic circuits being displaced with respect to one another respective angular amounts substantially equal to the phase displacement of the phases of the polyphase electric system, means for changing the polarities of the component magnetomotive forces supplied to, and the component voltages produced in the magnetic circuits of each assembly of magnetic circuits and corresponding to each phase of the polyphase electric system alternately with, and with the negative of, the sign of the said sine and for combining the said component voltages, in the said polarities, into composite voltages, one corresponding to each phase of the polyphase electric system, and the other element having means for producing a magnetic field, stationary with respect to the said other element, of substantially equiangularly spaced poles of alternately opposite polarity equal in number to the number of magnetic circuits of each assembly of magnetic circuits plus or minus the number of collections of magnetic circuits of each assembly of magnetic circuits.

6. A synchronous machine having, in combination, stator and rotor elements, one of the elements having means for producing a magnetic system, stationary with respect to the said one element, comprising one or more substantially like assemblies, each of the same number of magnetic circuits at positions sequentially separated in the same angular direction by an angle substantially equal to 360 degrees multiplied by an integral number, not a factor of the number of magnetic circuits of each assembly of magnetic circuits, divided by the number of magnetic circuits of each assembly of magnetic circuits, each assembly comprising the same number of one or more collections each of substantially the same number of magnetic circuits, means for supplying a component magnetomotive force and corresponding to each phase of a polyphase electric system to, and reacting to produce a component voltage for and corresponding to each phase of the polyphase electric system in, each magnetic circuit, the peak amplitudes of the component magnetomotive forces and the component voltages corresponding to the respective phases of the polyphase electric system being substantially proportional to the absolute values of the sine over a total range substantially equal to 180 degrees multiplied by the number of collections of magnetic circuits of each assembly of magnetic circuits at angular increments each substantially equal to the said total range divided by the number of magnetic circuits of each assembly of magnetic circuits, the respective total ranges of the respective assemblies of magnetic circuits being displaced with respect to one another respective angular amounts substantially equal to the phase displacement of the phases of the polyphase electric system, means for changing the polarities of the component magnetomotive forces supplied to, and the component voltages produced in, the magnetic circuits of each assembly of magnetic circuits and corresponding to each phase of the polyphase electric system alternately with, and with the negative of, the sign of the said sine and for combining the said component voltages, in the said polarities, into composite voltages, one corresponding to each phase of the polyphase electric system, and the other element having means for producing a magnetic field, stationary with respect to the said other element, of substantially equiangularly spaced poles of alternately opposite polarity equal in number to a number which, multiplied by the said integral number, is equal to the number of magnetic circuits of each assembly of magnetic circuits plus or minus the number of collections of magnetic circuits of each assembly of magnetic circuits.

7. A synchronous machine having, in combination, stator and rotor elements, one of the elements having means for producing a magnetic system, stationary with respect to the said one element, of an assembly of substantially equiangularly spaced magnetic circuits comprising more than two collections each of substantially the same number of magnetic circuits, means for supplying substantially like magnetomotive forces of alternately opposite polarity to, and reacting to produce substantially like voltages of alternately opposite polarity in, the magnetic circuits, the magnetomotive forces and the voltages respectively supplied to and produced in the magnetic circuits of the assembly of magnetic circuits being substantially equally phase-displaced, disregarding the alternately opposite polarity, over a total range substantially equal to 180 degrees multiplied by the number of collections of magnetic circuits of each assembly of magnetic circuits, and the other element having means for producing a magnetic field, stationary with respect to the said other element, of substantially equiangularly spaced poles of alternately opposite polarity equal in number to the number of magnetic circuits plus or minus the number of collections of magnetic circuits.

8. A synchronous machine having, in combination, stator and rotor elements, one of the elements having means for producing a magnetic system, stationary with respect to the said one element, of a plurality of substantially like assemblies, each of the same number, of substantially equiangularly spaced magnetic circuits, each assembly comprising the same number of one or more collections each of substantially the same number of magnetic circuits, means for supplying substantially like magnetomotive forces of alternately opposite polarity to, and reacting to produce substantially like voltages of alternately opposite polarity in, the magnetic circuits of each assembly of magnetic circuits, the magnetomotive forces and the voltages respectively supplied to and produced in the magnetic circuits of each assembly of magnetic circuits being substantially equally phase-displaced, disregarding the alternately opposite polarity, over a total range substantially equal to 180 degrees multiplied by the number of collections of magnetic circuits of each assembly of magnetic circuits, and the other element having means for producing a magnetic field, stationary with respect to the said other element, of substantially equiangularly spaced poles of alternately opposite polarity equal in number to the number of magnetic circuits of each assembly of magnetic circuits plus or minus the number of collections of magnetic circuits of each assembly of magnetic circuits.

9. A synchronous machine having, in combination, stator and rotor elements, one of the elements having means for producing a magnetic system, stationary with respect to the said one element, of a plurality of substantially like assemblies, each of the same number, of magnetic circuits at positions sequentially separated in the same angular direction by an angle substantially equal to 360 degrees multiplied by an integral number greater than unity, not a factor of the number of magnetic circuits of each assembly of magnetic circuits, divided by the number of magnetic circuits of each assembly of magnetic circuits, each assembly comprising the same number of one or more collections each of substantially the same number of magnetic circuits, means for supplying substantially like magnetomotive forces of alternately opposite polarity to, and reacting to produce substantially like voltages of alternately opposite polarity in, the magnetic circuits of each assembly of magnetic circuits, the magnetomotive forces and the voltages respectively supplied to and produced in the magnetic circuits of each assembly of magnetic circuits being substantially equally phase-displaced, disregarding the alternately opposite polarity, over a total range substantially equal to 180 degrees multiplied by the number of collections of magnetic circuits of each assembly of magnetic circuits, and the other element having means for producing a magnetic field, stationary with respect to the said other element, of substantially equiangularly spaced poles of alternately opposite polarity equal in number to a number which, multiplied by the said integral number, is equal to the number of magnetic circuits of each assembly of magnetic circuits plus or minus the number of collections of magnetic circuits of each assembly of magnetic circuits.

10. A synchronous machine having, in combination, stator and rotor elements, one of the elements having a magnetizable core provided with an assembly, stationary with respect to the said one element, of substantially equiangularly spaced slots comprising one or more collections each of substantially the same number of slots, a polyphase winding comprising a plurality of phase windings each having a number of conductor groups substantially equal to the number of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, and the other element having means for producing a magnetic field, stationary with respect to the said other element, of substantially equiangularly spaced poles of alternately opposite polarity equal in number to the number of slots plus or minus the number of collections of slots.

11. A synchronous machine having, in combination, stator and rotor elements, one of the elements having magnetizable-core means provided with an assembly, stationary with respect to the said one element, of substantially equiangularly spaced slots comprising one or more collections each of substantially the same number of slots, a polyphase winding comprising a plurality of phase windings each having a number of conductor groups substantially equal to the number of slots, a conductor group of each phase winding being disposed substantially in each slot, the numbers of conductors of the conductor groups of each phase winding varying substantially as the absolute values of the sine over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, and the other element having means for producing a magnetic field, stationary with respect to the said other element, of substantially equiangularly spaced poles of alternately opposite polarity equal in number to the number of slots plus or minus the number of collections of slots.

12. A synchronous machine having, in combination, stator and rotor elements, one of the elements having a magnetizable core provided with one or more substantially like assemblies, stationary with respect to the said one element, of substantially equiangularly spaced slots, each assembly comprising the same number of one or more collections each of substantially the same number of slots, a polyphase winding corresponding to each assembly of slots, each polyphase winding comprising a plurality of phase windings each having a number of conductor groups substantially equal to the number of slots of each assembly of slots, a conductor group of each phase winding being disposed substantially in each slot of the corresponding assembly of slots, the numbers of conductors of the conductor groups of each phase winding varying substantially as the absolute values of the sine over a total range substantially equal to 180 degrees multiplied by the number of collections of slots of each assembly of slots at angular increments each substantially equal to the said total range divided by the number of slots of each assembly of slots, the respective total ranges of the respective polyphase windings being displaced with respect to one another respective angular amounts substantially equal to the phase displacement of the phase windings of the respective polyphase windings, the directions of winding of the conductors of the conductor groups of each phase winding changing alternately with, and with the negative of, the sign of the said sine, the conductor groups of the respective phase windings being connected in series along the said directions of winding, and the other element having means for producing a magnetic field, stationary with respect to the said other element, of substantially equiangularly spaced poles of alternately opposite polarity equal in number to the number of slots of each assembly of slots plus or minus the number of collections of slots of each assembly of slots.

13. A synchronous machine having, in combination, stator and rotor elements, one of the elements having a magnetizable core provided with one or more substantially like assemblies, stationary with respect to the said one element, of slots at positions sequentially separated in the same angular direction by an angle substantially equal to 360 degrees multiplied by an integral number, not a factor of the number of slots of each assembly of slots, divided by the number of slots of each assembly of slots, each assembly comprising the same number of one or more collections each of substantially the same number of slots, a polyphase winding corresponding to each assembly of slots, each polyphase winding comprising a plurality of phase windings each having a number of conductor groups substantially equal to the number of slots of each assembly of slots, a conductor group of each phase winding being disposed substantially in each slot of the corresponding assembly of slots, the numbers of conductors of the conductor groups of each phase winding varying substantially as the absolute values of the sine over a total range substantially equal to 180 degrees multiplied by the number of collections of slots of each assembly of slots at angular increments each substantially equal to the said total range divided by the number of slots of each assembly of slots, the respective total ranges of the respective polyphase windings being displaced with respect to one another respective angular amounts substantially equal to the phase displacement of the respective phase windings of the respective polyphase windings, the directions of winding of the conductors of the conductor groups of each phase winding changing alternately with, and with the negative of, the sign of the said sine, the conductor groups of the respective phase windings being connected in series along the said directions of winding, and the other element having means for producing a magnetic field, stationary with respect to the said other element, of substantially equiangularly spaced poles of alternately opposite polarity equal in number to a number which, multiplied by the said integral number, is equal to the number of slots of each assembly of slots plus or minus the number of collections of slots of each assembly of slots.

14. A synchronous machine having, in combination, stator and rotor elements, one of the elements having means for producing a magnetic system, stationary with respect to the said one element, of substantially equiangularly spaced magnetic fluxes of alternately opposite polarity substantially equally phase-displaced, disregarding the alternately opposite polarity, over a total range substantially equal to a multiple of 180 degrees, the other element having means for producing a magnetic field, stationary with respect to the said other element, of substantially equiangularly spaced poles of alternately opposite polarity equal in number to the number of magnetic fluxes plus or minus the said multiple, and means for starting the machine as an induction motor.

15. A synchronous machine having, in combination, stator and rotor elements, one of the elements having means for producing one or more substantially like magnetic systems, stationary with respect to the said one element, each of the same number of substantially equiangularly spaced magnetic fluxes of alternately opposite polarity substantially equally phase-displaced, disregarding the alternately opposite polarity, over a total range substantially equal to the same multiple of 180 degrees, the other element having means for producing a magnetic field, stationary with respect to the said other element, of substantially equiangularly spaced poles of alternately opposite polarity equal in number to the number of magnetic fluxes of each system of magnetic fluxes plus or minus the said multiple, and means for starting the machine as an induction motor.

16. A synchronous machine having, in combination, stator and rotor elements, one of the elements having means for producing a magnetic system, stationary with respect to the said one element, of magnetic fluxes of alternately opposite polarity at positions sequentially separated in the same angular direction by an angle substantially equal to 360 degrees multiplied by an integral number, not a factor of the number of magnetic fluxes, divided by the number of magnetic fluxes, the magnetic fluxes being substantially equally phase-displaced, disregarding the alternately opposite polarity, over a total range substantially equal to a multiple of 180 degrees, the other element having means for producing a magnetic field, stationary with respect to the said other element, of substantially equiangularly spaced poles of alternately opposite polarity equal in number to a number which, multiplied by the said integral number, is equal to the number of magnetic fluxes plus or minus the said multiple, and means for starting the machine as an induction motor.

17. A synchronous machine having, in combination, stator and rotor elements, one of the elements having means for producing a magnetic system, stationary with respect to the said one element, of a first set of magnetic fluxes of alternately opposite polarity at positions sequentially separated in the same angular direction by an angle substantially equal to 360 degrees multiplied by an integral number, not a factor of the number of magnetic fluxes, divided by the number of magnetic fluxes, the magnetic fluxes being substantially equally phase-displaced, disregarding the alternately opposite polarity, over a total range substantially equal to a multiple of 180 degrees, the other element having means for producing a first magnetic field, stationary with respect to the said other element, of substantially equiangularly spaced poles of alternately opposite polarity equal in number to a number which, multiplied by the said integral number, is equal to the number of magnetic fluxes plus or minus the said multiple in order to produce a second set of magnetic fluxes of alternately opposite polarity at the said positions, the magnetic fluxes of the second set of magnetic fluxes being substantially equally phase-displaced, disregarding the alternately opposite polarity over a total range substantially equal to the same multiple of 180 degrees, and means for producing from the first set of magnetic fluxes a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

18. A synchronous machine having, in combination, stator and rotor elements, one of the elements having magnetizable-core means provided with an assembly, stationary with respect to the said one element, of substantially equiangularly spaced slots comprising more than two collections each of substantially the same number of slots, a polyphase winding comprising a plurality of substantially like phase windings of alternately opposite polarity wound through the slots, means for connecting the windings to the respective phases of a polyphase load or a polyphase source of voltage that are substantially equally phase-displaced over a total range of phase displacement substantially equal to 180 degrees multiplied by the number of collections of slots, and the other element having means for producing a magnetic field, stationary with respect to the said other element, of substantially equiangularly spaced poles of alternately opposite polarity equal in number to the number of slots plus or minus the number of collections of slots.

19. A synchronous machine having, in combination, stator and rotor elements, one of the elements having magetizable-core means provided with an assembly, stationary with respect to the said one element, of substantially equiangularly spaced slots comprising one or more collections each of substantially the same number of slots, a polyphase winding comprising a plurality of substantially like phase windings of alternately opposite polarity wound through the slots, means for connecting the windings to the respective phases of a polyphase load or a polyphase source of voltage that are substantially equally phase-displaced over a total range of phase displacement substantially equal to 180 degrees multiplied by the number of collections of slots, the other element having means for producing a first magnetic field, stationary with respect to the said other element, of substantially equiangularly spaced poles of alternately opposite polarity equal in number to the number of slots plus or minus the number of collections of slots, and means for producing a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

20. A synchronous machine having, in combination, stator and rotor elements, one of the elements having magnetizable-core means provided with an assembly, stationary with respect to the said one element, of substantially equiangularly spaced slots comprising one or more collections each of substantially the same number of slots, a polyphase winding comprising a plurality of substantially like phase windings of alternately opposite polarity respectively wound through the slots, each phase winding having two terminals, means connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots, and the other element having means for producing a magnetic field, stationary with respect to the said other element, of substantially equiangularly spaced poles of alternately opposite polarity equal in number to the number of slots plus or minus the number of collections of slots.

21. A synchronous machine having, in combination, stator and rotor elements, one of the elements having a magnetizable core provided with one or more substantially like assemblies, stationary with respect to the said one element, each of the same number of substantially equiangularly spaced slots, each assembly comprising the same number of one or more collections each of substantially the same number of slots, a polyphase winding corresponding to each assembly of slots, each polyphase winding comprising a plurality of substantially like phase winding of alternately opposite polarity respectively wound through the slots of the corresponding assembly of slots, each phase winding of each polyphase winding having two terminals, means for connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots of each assembly of slots, and the other element having means for producing a magnetic field, stationary with respect to the said other element, of substantially equiangularly spaced poles of alternately opposite polarity equal in number to the number of slots of each assembly of slots plus or minus the number of collections of slots of each assembly of slots.

22. A synchronous machine having, in combination, stator and rotor elements, one of the elements having a magnetizable core provided with one or more substantially like assemblies, stationary with respect to the said one element, of slots at positions sequentially separated in the same angular direction by an angle substantially equal to 360 degrees multiplied by an integral number, not a factor of the number of slots of each assembly of slots, divided by the number of slots of each assembly of slots, each assembly comprising the same number of one or more collections each of substantially the same number of slots, a polyphase winding corresponding to each assembly of slots, each polyphase winding comprising a plurality of substantially like phase windings of alternately opposite polarity respectively wound through the slots of the corresponding assembly of slots, each phase winding of each polyphase winding having two terminals, means for connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots of each assembly of slots, and the other element having means for producing a magnetic field, stationary with respect to the said other element, of substantially equiangularly spaced poles of alternately opposite polarity equal in number to a number which, multiplied by the said integral number, is equal to the number of slots of each assembly of slots plus or minus the number of collections of slots of each assembly of slots.

23. A synchronous machine having, in combination, stator and rotor elements, one of the elements having magnetizable-core means provided with an assembly, stationary with respect to the said one element, of substantially equiangularly spaced slots comprising one or more collections each of substantially the same number of slots, a polyphase winding comprising a plurality of substantially like phase windings of alternately opposite polarity each of which is wound through adjacently disposed slots, each phase winding having two terminals, means connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots, and the other element having means for producing a magnetic field, stationary with respect to the said other element, of substantially equiangularly spaced poles of alternately opposite polarity equal in number to the number of slots plus or minus the number of collections of slots.

24. A synchronous machine having, in combination, stator and rotor elements, one of the elements having a magnetizable core provided with one or more substantially like assemblies, stationary with respect to the said one element, each of substantially the same number of substantially equiangularly spaced slots, each assembly comprising the same number of one or more collections each of substantially the same number of slots, a polyphase winding corresponding to each assembly of slots, each polyphase winding comprising a plurality of substantially like phase windings of alternately opposite polarity each of which is wound through adjacently disposed slots of the corresponding assembly of slots, each phase winding of each polyphase winding having two terminals, means for connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots of each assembly of slots, and the other element having means for producing a magnetic field, stationary with respect to the said other element, of substantially equiangularly spaced poles of alternately opposite polarity equal in number to the number of slots of each assembly of slots plus or minus the number of collections of slots of each assembly of slots.

25. A synchronous machine having, in combination, stator and rotor elements, one of the elements having a magnetizable core provided with one or more substantially like assemblies, stationary with respect to the said one element, of slots at positions sequentially separated in the same angular direction by an angle substantially equal to 360 degrees multiplied by an integral number, not a factor of the number of slots of each assembly of slots, divided by the number of slots of each assembly of slots, each assembly comprising the same number of one or more collections each of substantially the same number of slots, a polyphase winding corresponding to each assembly of slots, each polyphase winding comprising a plurality of substantially like phase windings each of which is wound through adjacently disposed slots of the corresponding assembly of slots, each phase winding of each polyphase winding having two terminals, means for connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots of each assembly of slots, and the other element having means for producing a magnetic field, stationary with respect to the said other element, of substantially equiangularly spaced poles of alternately opposite polarity equal in number to a number which, multiplied by the said integral number, is equal to the number of slots of each assembly of slots plus or minus the number of collections of slots of each assembly of slots.

26. A synchronous machine having, in combination, stator and rotor elements, one of the elements having means for producing a magnetic system, stationary with respect to the said one element, of a first set of substantially equiangularly spaced magnetic fluxes of alternately opposite polarity substantially equally phase-displaced, disregarding the alternately opposite polarity, over a total range substantially equal to a multiple of 180 degrees, the other element having means for producing a first magnetic field, stationary with respect to the said other element, of substantially equiangularly spaced poles of alternately opposite polarity equal in number to the number of magnetic fluxes plus or minus the said multiple in order to produce in the said one element a second set of substantially equiangularly spaced magnetic fluxes of alternately opposite polarity substantially equally phase-displaced, disregarding the alternately opposite polarity, over a total range substantially equal to the same multiple of 180 degrees, and means for producing from the first set of magnetic fluxes a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

27. A synchronous machine having, in combination, stator and rotor elements, one of the elements having a polyphase-winding means for producing a magnetic system, stationary with respect to the said one element, of a first set of substantially equiangularly spaced magnetic fluxes of alternately opposite polarity substantially equally phase-displaced, disregarding the alternately opposite polarity, over a total range substantially equal to a multiple of 180 degrees, the other element having means for producing a first magnetic field, stationary with respect to the said other element, of substantially equiangularly spaced poles of alternately opposite polarity equal in number to the number of magnetic fluxes plus or minus the said multiple in order to produce in the said one element a second set of substantially equiangularly spaced magnetic fluxes of alternately opposite polarity substantially equally phase-displaced, disregarding the alternately opposite polarity, over a total range substantially equal to the same multiple of 180 degrees, and a winding cooperating with the polyphase-winding means for producing from the first set of magnetic fluxes a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

28. A synchronous machine having, in combination, stator and rotor elements, one of the elements having means for producing a magnetic system, stationary with respect to the said one element, of an assembly of substantially equiangularly spaced magnetic circuits comprising one or more collections each of substantially the same number of magnetic circuits, means for supplying substantially like magnetomotive forces of alternately opposite polarity to, and reacting to produce substantially like component voltages of alternately opposite polarity in, the magnetic circuits, the magnetomotive forces and the voltages respectively supplied to and produced in the magnetic circuits of the assembly of magnetic circuits being substantially equally phase-displaced, disregarding the alternately opposite polarity, over a total range substantially equal to 180 degrees multiplied by the number of collections of magnetic circuits of the assembly of magnetic circuits, the other element having means for producing a first magnetic field, stationary with respect to the said other element, of substantially equiangularly spaced poles of alternately opposite polarity equal in number to the number of magnetic circuits plus or minus the number of collections of magnetic circuits, and means for producing from the supplied magnetomotive forces a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

29. A synchronous machine having, in combination, stator and rotor elements, one of the elements having magnetizable-core means provided with an assembly, stationary with respect to the said one element, of substantially equiangularly spaced slots comprising one or more collections each of substantially the same number of slots, a polyphase winding comprising a plurality of substantially like phase windings of alternately opposite polarity wound through the slots, means for connecting the windings to the respective phases of a polyphase load or a polyphase source of voltage that are substantially equally phase-displaced over a total range of phase displacement substantially equal to 180 degrees multiplied by the number of collections of slots, and the other element having means for producing a first magnetic field, stationary with respect to the said other element, of substantially equiangularly spaced poles of alternately opposite polarity equal in number to the number of slots plus or minus the number of collections of slots, and means cooperating with the polyphase winding for producing a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

30. A synchronous machine having, in combination, stator and rotor elements, one of the elements having magnetizable-core means provided with an assembly stationary with respect to the said one element, of substantially equiangularly spaced slots comprising one or more collections each of substantially the same number of slots, a polyphase winding comprising a plurality of substantially like phase windings of alternately opposite polarity wound through the slots, each phase winding having two terminals, means connecting the terminals of the phase windings to corresponding terminals of the respective phases of a polyphase load or a polyphase source of voltage that are substantially equally phase-displaced over a total range of phase displacement substantially equal to 180 degrees multiplied by the number of collections of slots, the other element having means for producing a first magnetic field, stationary with respect to the said other element, of substantially equiangularly spaced poles of alternately opposite polarity equal in number to the number of slots plus or minus the number of collections of slots, and means for producing a second magnetic field, rotating with respect to the said other element, having the same number of substantially equiangularly spaced poles of alternately opposite polarity as the number of poles of the first magnetic field, whereby the second magnetic field operates under starting or damping conditions to establish synchronous operation of the machine.

31. A synchronous motor having, in combination, stator and rotor elements, one of the elements having means for producing a magnetic field, stationary with respect to the said one element, of substantially equiangularly spaced poles of alternately opposite polarity, means for supplying to the other element, at respective substantially equiangularly spaced positions thereof, voltages that are substantially equally phase-displaced over a total range substantially equal to a multiple of 180 degrees, the number of positions and voltages being each equal to the number of poles plus or minus the said multiple, and the said other element having means for producing from the supplied voltages a magnetic system, stationary with respect to the said other element, of substantially equiangularly spaced alternating magnetic fluxes, equal in number to the number of supplied voltages, and each produced by one of the supplied voltages, of alternately opposite polarity that are substantially equally phase-displaced, disregarding the alternately opposite polarity, over a total range substantially equal to the said multiple of 180 degrees.

32. A synchronous motor having, in combination, stator and rotor elements, one of the elements having means for producing a first magnetic field, stationary with respect to the said one element, of substantially equiangularly spaced poles of alternately opposite polarity, means for supplying to the other element, at respective substantially equiangularly spaced positions thereof, voltages that are substantially equally phase-displaced over a total range substantially equal to a multiple of 180 degrees, the number of positions and voltages being each equal to the number of poles plus or minus the said multiple, the other element having means for producing from the supplied voltages a magnetic system, stationary with respect to the said other element, of substantially equiangularly spaced alternating magnetic fluxes, equal in number to the number of supplied voltages, and each produced by one of the supplied voltages, of alternately opposite polarity that are substantially equally phase-displaced, disregarding the alternately opposite polarity, over a total range substantially equal to the said multiple of 180 degrees, and the said one element having means for producing from the magnetic fluxes a second magnetic field, rotating with respect to the said one element, having the same number of substantially equiangularly spaced poles of alternately opposite polarity as the number of poles of the first magnetic field, whereby the second magnetic field operates under starting and damping conditions to establish synchronous operation of the motor.

33. A synchronous generator having, in combination, stator and rotor elements, one of the elements having means for producing a magnetic field, stationary with respect to the said one element, of substantially equiangularly spaced poles of alternately opposite polarity, the other element having means cooperative with the said one element for producing a magnetic system, stationary with respect to the said other element, of substantially equiangularly spaced alternating magnetic fluxes of alternately opposite polarity that are substantially equally phase-displaced, disregarding the alternately opposite polarity, over a total range substantially equal to a multiple of 180 degrees, the number of alternating magnetic fluxes being equal to the number of poles plus or minus the said multiple, means for inducing from the alternating magnetic fluxes, at their respective locations, voltages that are substantially equally phase-displaced over a total range substantially equal to the said multiple of 180 degrees, and means for connecting the induced voltages to the respective phases of a polyphase load that are correspondingly substantially equally phase-displaced over the said total range.

34. A synchronous machine having, in combination, stator and rotor elements, one of the elements having means for producing a magnetic system, stationary with respect to the said one element, comprising an assembly of one or more collections each of substantially the same number of magnetic circuits, a polyphase winding comprising a plurality of phase windings each having a number of conductor groups substantially equal to the number of magnetic circuits of the assembly of magnetic circuits, a conductor group of each phase winding being disposed substantially in each magnetic circuit, the numbers of conductors of the conductor groups of each phase winding varying substantially as the absolute values of the sine over a total range substantially equal to 180 degrees multiplied by the number of collections of magnetic circuits at angular increments each substantially equal to the said total range divided by the number of magnetic circuits, the respective total ranges being displaced with respect to one another an angular amount substantially equal to the phase displacement of the phase windings, the directions of winding of the conductors of the conductor groups of each phase winding changing alternately with, and with the negative of, the sign of the said sine, the conductor groups of the respective phase windings being connected in series along the said directions of winding, and the other element having means for producing a magnetic field, stationary with respect to the said other element, of substantially equiangularly spaced poles of alternately opposite polarity equal in number to the number of magnetic circuits plus or minus the number of collections of magnetic circuits.

35. A synchronous machine having, in combination, stator and rotor elements, one of the elements having a magnetizable core provided with an assembly, stationary with respect to the said one element, of substantially equiangularly spaced slots comprising one or more collections each of substantially the same number of slots, a polyphase winding comprising a plurality of phase windings each having a number of conductor groups substantially equal to the number of slots, a conductor group of each phase winding being disposed substantially in each slot, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and finally, increase again to zero in the interval 270 to 360 degrees, over a total range substantially equal to 180 degrees multiplied by the number of collections of slots at angular increments each substantially equal to the said total range divided by the number of slots, the respective total ranges being displaced with respect to one another an angular amount substantially equal to the phase displacement of the respective phase windings, the directions of winding of the conductor groups of each phase winding changing alternately with, and with the negative of, the sign of the said alternating function, the conductor groups of the respective phase windings being connected in series along the said directions of winding, and the other element having means for producing a magnetic field, stationary with respect to the said other element, of substantially equiangularly spaced poles of alternately opposite polarity equal in number to the number of slots plus or minus the number of collections of slots.

36. A synchronous machine having, in combination, stator and rotor elements, one of the elements having a magnetizable core provided with one or more assemblies, stationary with respect to the said one element, of substantially equiangularly spaced slots, each assembly comprising the same number of one or more collections each of substantially the same number of slots, a polyphase winding corresponding to each assembly of slots, each polyphase winding comprising a plurality of phase windings each having a number of conductor groups substantially equal to the number of slots of each assembly of slots, a conductor group of each phase winding being disposed substantially in each slot of the corresponding assembly of slots, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots of each assembly of slots at angular increments each substantially equal to the said total range divided by the number of slots of each assembly of slots, the respective total ranges of the respective polyphase windings being displaced with respect to one another respective angular amounts substantially equal to the phase displacement of the respective phase windings of the respective polyphase windings, the directions of winding of the conductors of the conductor groups of each phase winding changing alternately with, and with the negative of, the sign of the said alternating function, the conductor groups of the respective phase windings being connected in series along the said directions of winding, and the other element having means for producing a magnetic field, stationary with respect to the said other element, of substantially equiangularly spaced poles of alternately opposite polarity equal in number to the number of slots of each assembly of slots plus or minus the number of collections of slots of each assembly of slots.

37. A synchronous machine having, in combination, stator and rotor elements, one of the elements having a magnetizable core provided with one or more substantially like assemblies, stationary with respect to the said one element, of slots at positions sequentially separated in the same angular direction by an angle substantially equal to 360 degrees multiplied by an integral number, not a factor of the number of slots of each assembly of slots, divided by the number of slots of each assembly of slots, each assembly comprising the same number of one or more collections each of substantially the same number of slots, a polyphase winding corresponding to each assembly of slots, each polyphase winding comprising a plurality of phase windings each having a number of conductor groups substantially equal to the number of slots of each assembly of slots, a conductor group of each phase winding being disposed substantially in each slot of the corresponding assembly of slots, the numbers of conductors of the conductor groups of each phase winding varying substantially as the absolute values of an alternating function the values of which progressively, first, increase from zero to a maximum in the interval zero to 90 degrees, then, decrease through zero to a minimum in the interval 90 to 270 degrees, and, finally, increase again to zero in the interval 270 to 360 degrees, over a total range substantially equal to 180 degrees multiplied by the number of collections of slots of each assembly of slots at angular increments each substantially equal to the said total range divided by the number of slots of each assembly of slots, the respective total ranges of the respective polyphase windings being displaced with respect to one another respective angular amounts substantially equal to the phase displacement of the respective phase windings of the respective polyphase windings, the directions of winding of the conductors of the conductor groups of each phase winding changing alternately with, and with the negative of, the sign of the said alternating function, the conductor groups of the respective phase windings being connected in series along the said directions of winding, and the other element having means for producing a magnetic field, stationary with respect to the said other element, of substantially equiangularly spaced poles of alternately opposite polarity equal in number to a number which, multiplied by the said integral number, is equal to the number of slots of each assembly of slots plus or minus the number of collections of slots of each assembly of slots.

References Cited in the file of this patent
UNITED STATES PATENTS

| | | |
|---|---|---|
| 618,578 | Newcomb | Jan. 31, 1899 |
| 1,725,849 | Cope | Aug. 27, 1929 |
| 1,824,909 | Martin | Sept. 29, 1931 |
| 2,408,219 | Liwschitz | Sept. 24, 1946 |
| 2,535,914 | Glass | Dec. 26, 1950 |
| 2,550,663 | Berchberger et al. | May 1, 1951 |

FOREIGN PATENTS

| | | |
|---|---|---|
| 301,848 | Great Britain | Dec. 7, 1928 |